United States Patent
Taniai

(10) Patent No.: US 11,222,237 B2
(45) Date of Patent: Jan. 11, 2022

(54) REINFORCEMENT LEARNING MODEL FOR LABELING SPATIAL RELATIONSHIPS BETWEEN IMAGES

(71) Applicant: OMRON Corporation, Kyoto (JP)

(72) Inventor: Tatsunori Taniai, Tokyo (JP)

(73) Assignee: OMRON CORPORATION, Kyoto (JP)

(*) Notice: Subject to any disclaimer, the term of this patent is extended or adjusted under 35 U.S.C. 154(b) by 37 days.

(21) Appl. No.: 16/861,124

(22) Filed: Apr. 28, 2020

(65) Prior Publication Data
US 2021/0334592 A1    Oct. 28, 2021

(51) Int. Cl.
G06K 9/62    (2006.01)
G06N 3/04    (2006.01)
G06K 9/32    (2006.01)
G06N 3/08    (2006.01)

(52) U.S. Cl.
CPC ......... *G06K 9/6256* (2013.01); *G06K 9/3233* (2013.01); *G06N 3/0454* (2013.01); *G06N 3/08* (2013.01)

(58) Field of Classification Search
CPC combination set(s) only.
See application file for complete search history.

(56) References Cited

U.S. PATENT DOCUMENTS

| | | | |
|---|---|---|---|
| 2017/0262995 A1* | 9/2017 | Li | G06N 3/0454 |
| 2020/0125955 A1* | 4/2020 | Klinger | G06N 3/0472 |
| 2021/0004962 A1* | 1/2021 | Tsai | G06K 9/726 |

OTHER PUBLICATIONS

Joohyun Shin, "Reinforcement Learning—Overview of recent progress and implications for process control"—May 19, 2019, Computers and Chemical Engineering 127 (2019), pp. 282-291.*
Dongbin Zhao,"Deep Reinforcement Learning With Visual Attention for Vehicle Classification", Dec. 2017,IIEEE Transactions on Cognitive and Developmental Systems, vol. 9, No. 4,pp. 356-365.*

* cited by examiner

*Primary Examiner* — Omar S Ismail
(74) *Attorney, Agent, or Firm* — Alleman Hall Creasman & Tuttle LLP

(57) ABSTRACT

A computing system is provided, including a processor configured to receive a labeling map for a first image. The labeling map may indicate a spatial relationship between a first region of interest included in the first image and a second region of interest included in a second image. At a trained reinforcement learning model, the processor may be further configured to generate an updated labeling map for the first image based on at least the labeling map, the first image, and the second image.

18 Claims, 15 Drawing Sheets

*IMAGE STREAM USED IN OPTICAL FLOW IMAGE PROCESSING*

*IMAGE STREAM IN BINOCULAR OR MULTI-VIEW STEREOSCOPIC IMAGING*

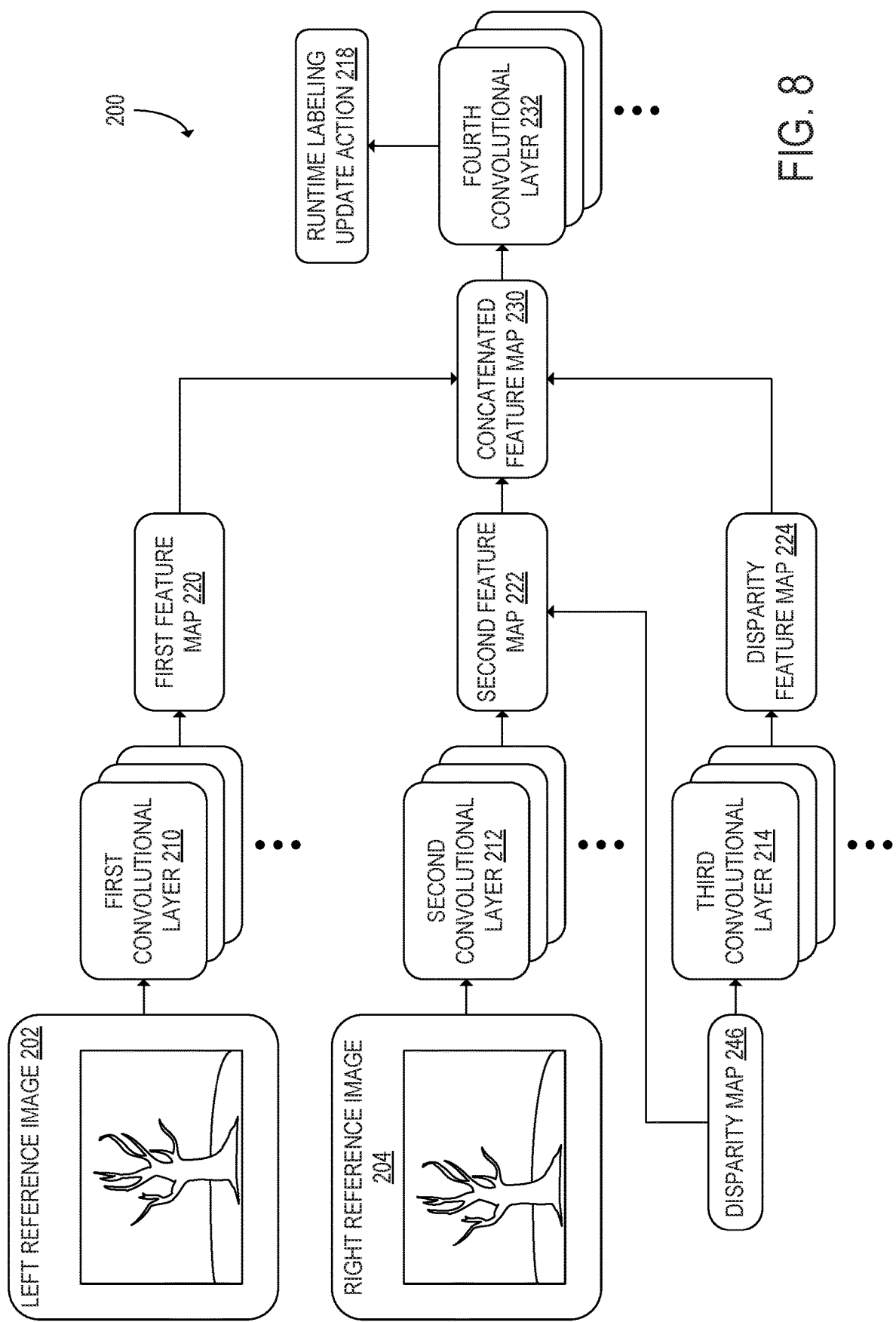

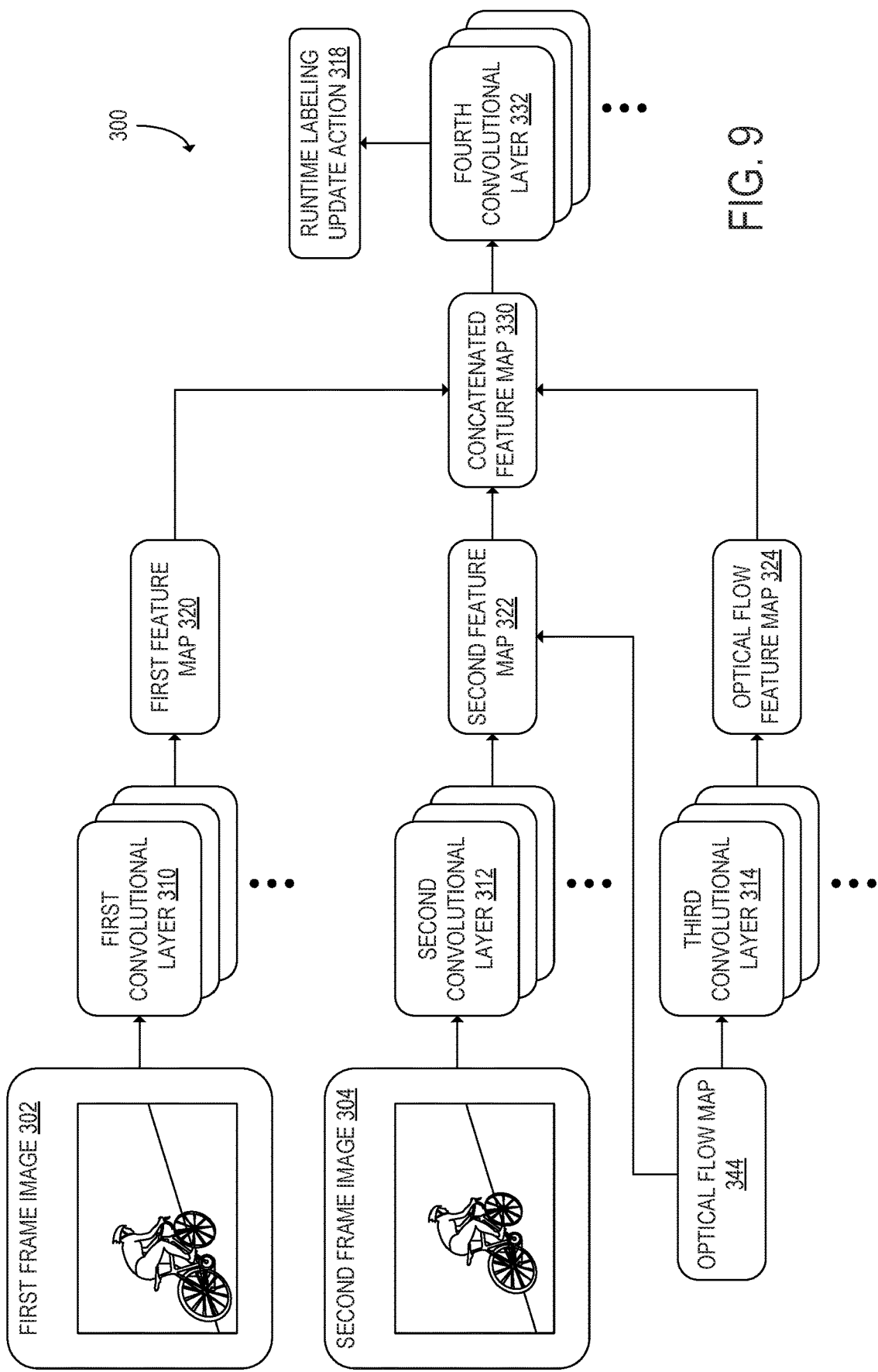

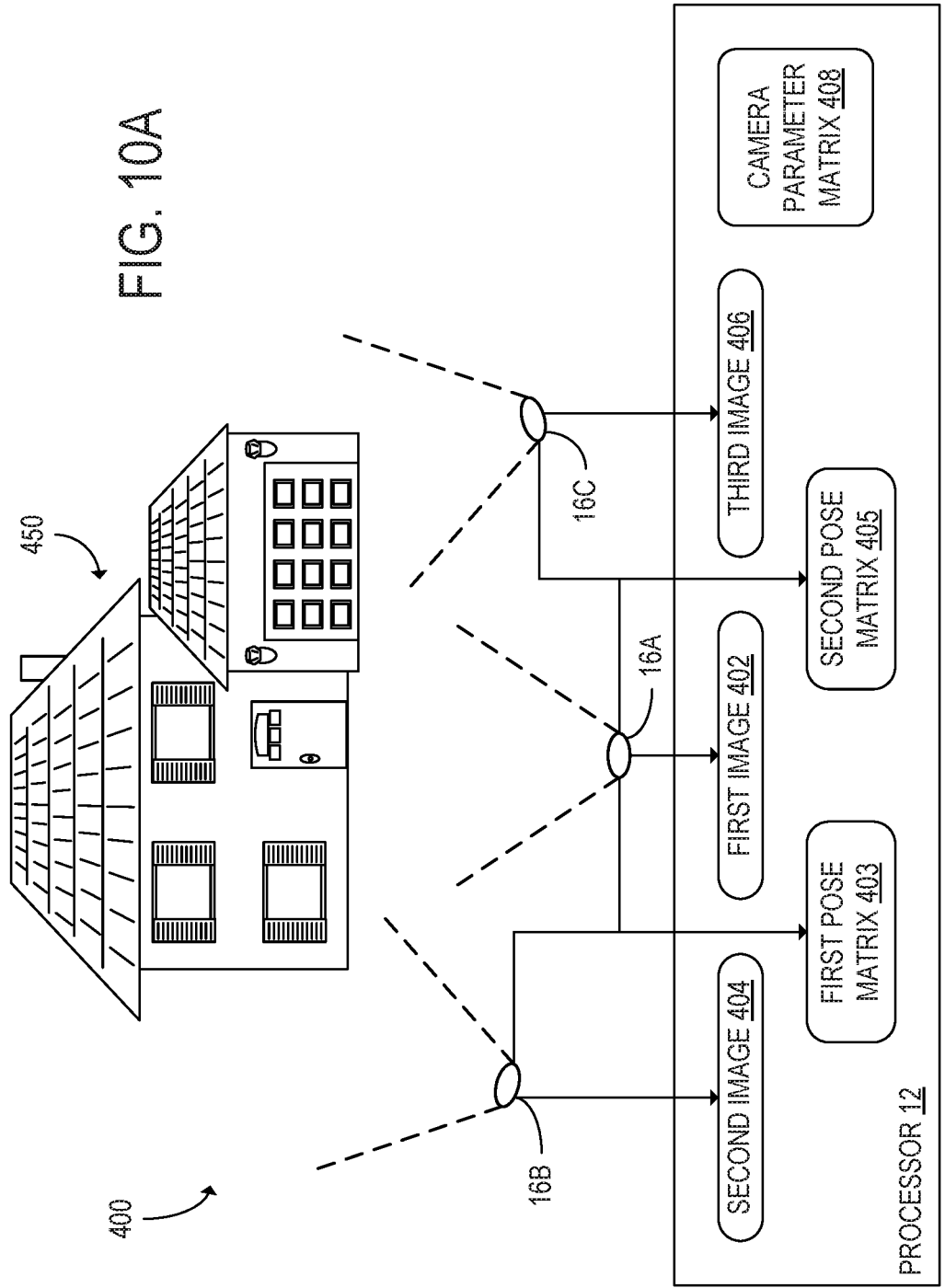

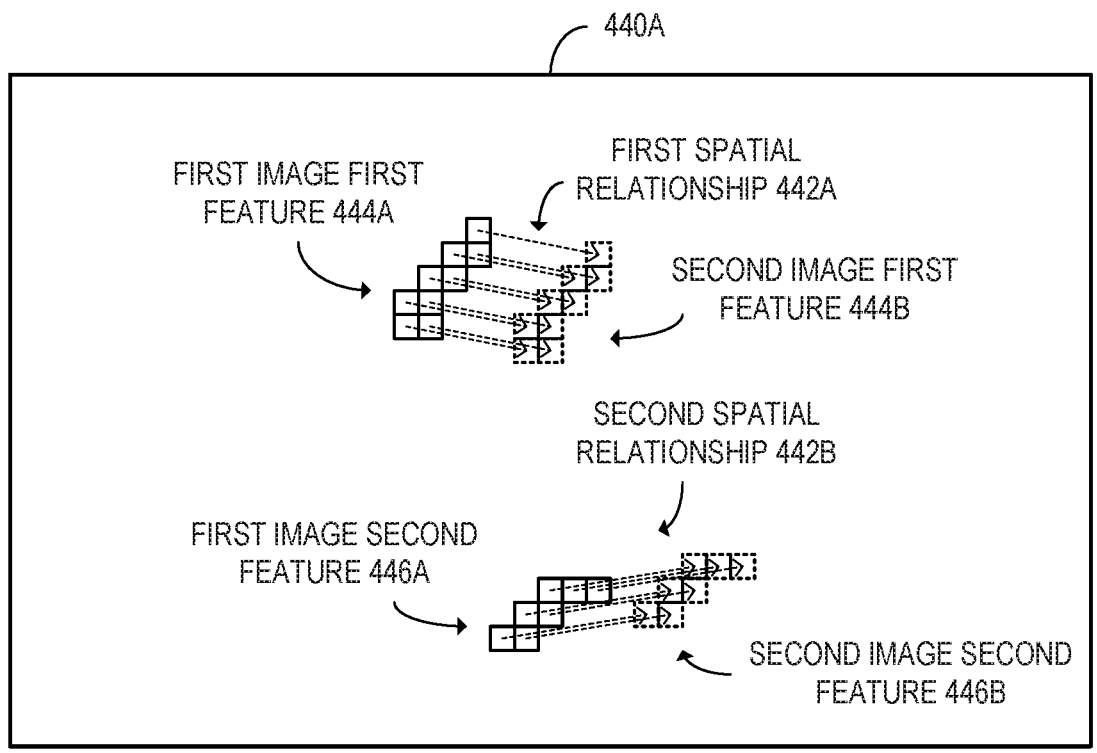
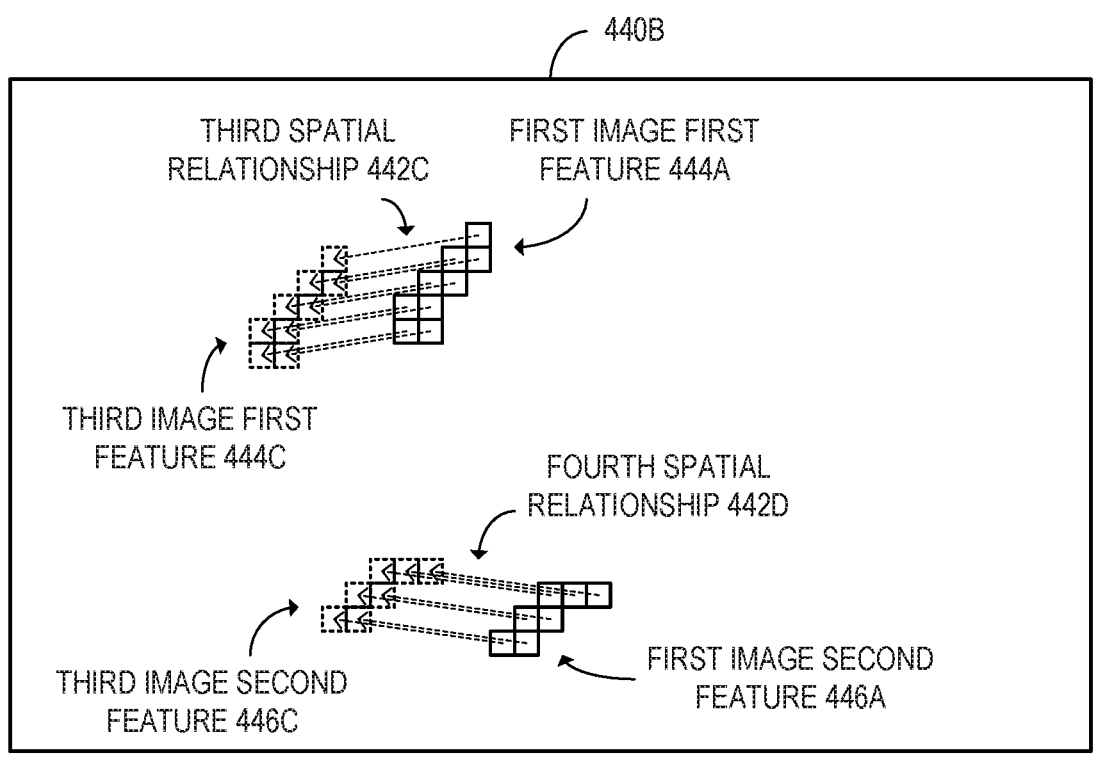
FIG. 11C

REINFORCEMENT LEARNING MODEL FOR LABELING SPATIAL RELATIONSHIPS BETWEEN IMAGES

BACKGROUND

Computer vision techniques have been developed that enable computer systems to interpret images and gain an understanding of their content. For example, techniques have been developed to estimate spatial relationships between images. As one example, techniques have been developed to estimate optical flow between features detected in two images taken at two moments in time. As another example, techniques have been developed to determine depth based on differences between binocular or multi-view stereo image pairs of a scene. These techniques employ algorithms that estimate correspondence between pixels in different images. However, estimating correspondence between pixels consumes significant compute time and resources, particularly when exhaustive or randomized search methods are employed. Therefore, a technical challenge exists to improve the efficiency of correspondence estimation, to thereby reduce the overall computational cost when performing these types of computer vision operations.

SUMMARY

According to one aspect of the present disclosure, a computing system is provided, including a processor configured to receive a labeling map for a first image. The labeling map may indicate a spatial relationship between a first region of interest included in the first image and a second region of interest included in a second image. At a trained reinforcement learning model, the processor may be further configured to generate an updated labeling map for the first image based on at least the labeling map, the first image, and the second image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 8 shows an example data flow when the processor generates a runtime labeling update action for a disparity map, according to the embodiment of FIG. 1.

FIG. 9 shows an example data flow when the processor generates a runtime labeling update action for an optical flow map, according to the embodiment of FIG. 1.

FIG. 10A shows an example imaging configuration in which a first camera, a second camera, and a third camera are configured to concurrently image the same physical environment, according to the embodiment of FIG. 1.

FIG. 11C shows a first example depth map and a second example depth map, according to the embodiment of FIG. 1.

DETAILED DESCRIPTION

Figure 1:
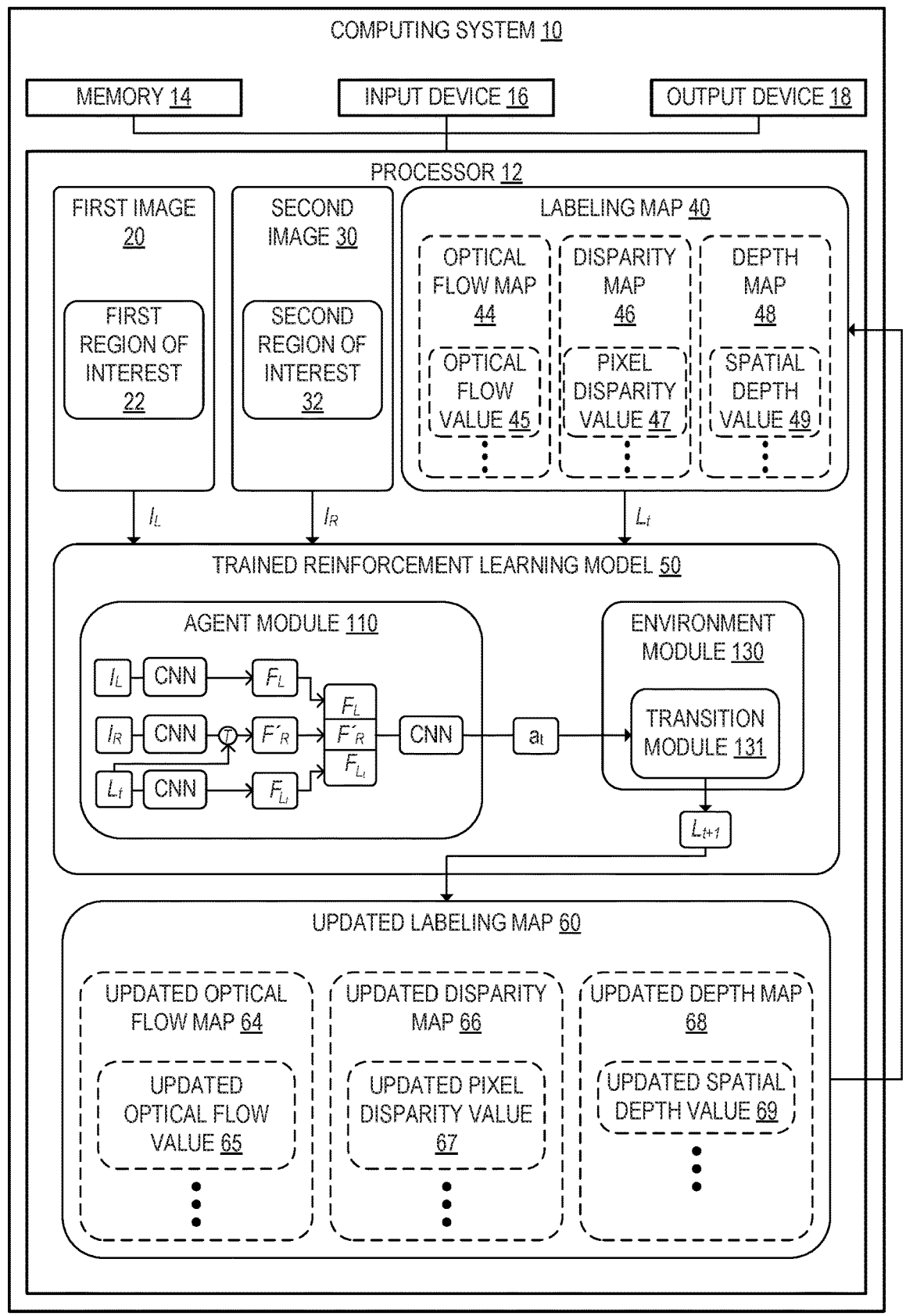
FIG. 1 schematically shows an example computing system including a processor configured to execute a trained reinforcement learning model at run-time to estimate spatial relationships between a pair of input images of an image stream and record those spatial relationships in an updated labeling map, according to one embodiment of the present disclosure.

In order to address the above challenges, a computing system 10 is provided, as schematically shown in FIG. 1. While prior approaches to determining spatial relationships between a pair of images, such as optical flow, disparity, and depth, have generally relied upon deterministic algorithms for their solutions, computing system 10 adopts an approach based on machine learning, and in particular based on reinforcement learning. This approach trains a machine learning model to predict the spatial relationships, typically on a pixelwise basis between pairs of images. The pixelwise predictions of spatial relationships are stored in a labeling map, which is updated and optimized using reinforcement learning techniques, as described below. By adopting such an approach, it is believed that the efficiency of computing correspondence estimates between images can be improved.

Previous methods of searching for pixel correspondences include performing an exhaustive search; performing a search of a predefined subset of labels; and generating a candidate label by randomly perturbing its currently assigned label and testing the new label for the pixel to determine whether the new label is a more accurate match.

However, these previous methods are often computationally inefficient. In contrast, the present approach utilizes reinforcement learning, which may be leveraged, for example, to provide attention mechanisms that are tuned to different time scales. This has the potential benefit of enabling a more intelligent, and as a result, a more computationally efficient, search for pixel correspondences.

Other existing labeling methods such as Lucas-Kanade include incrementally updating assigned labels over time. These existing methods may, for example, use gradient descent. However, these methods only account for short-term improvements in labeling accuracy between iterations, and accordingly are likely to become stuck in local optima. In contrast, the systems and methods discussed below may consider longer and multiple scale time intervals and thereby achieve improvements in labeling accuracy.

The computing system 10 may include a processor 12 configured to execute program instructions. In addition, the computing system 10 may include memory 14, which may store instructions executable by the processor 12. The memory 14 may include volatile storage and/or non-volatile storage. When the memory 14 includes non-volatile storage, the memory 14 may further store other data in addition to program instructions. In some embodiments, the computing system 10 may include one or more respective input devices 16 such as a keyboard, a mouse, a touchscreen, a trackpad, a microphone, an optical sensor, an accelerometer, or some other type of input device 16. The computing system 10 may also include one or more respective output devices 18 such as a display, a speaker, a haptic feedback device, or some other type of output device 18.

In some embodiments, the functions of the computing system 10 may be distributed across a plurality of physical computing devices that are communicatively coupled. For example, the computing system 10 may include one or more server computing devices that are configured to communicate with one or more client computing devices over a network. In some embodiments, the computing system 10 may include a plurality of communicatively coupled server computing devices located in a data center.

The processor 12 may be configured to apply the techniques discussed below to at least a first image 20 and a second image 30. For example, the first image 20 and the second image 30 may be sequential frames in a video. As another example, the first image 20 and the second image 30 may be images of the same three-dimensional environment taken by respective cameras positioned at different locations. Thus, the first image 20 and the second image 30 may have been taken from different perspectives. The first image 20 and the second image 30 may each include a respective plurality of pixels each having respective color values. In some embodiments, the techniques described below may be applied to three or more images.

Figure 2:
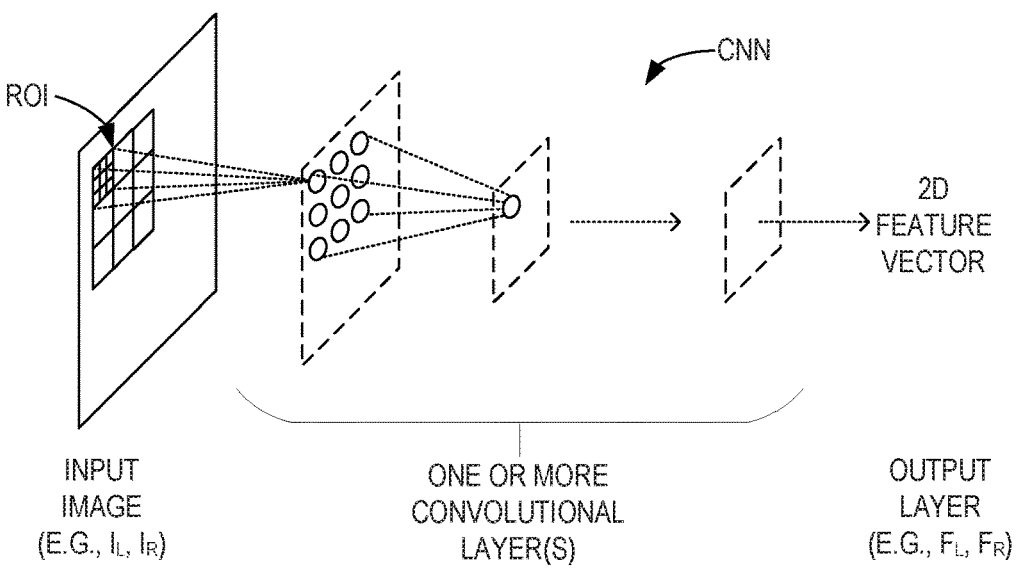
FIG. 2 schematically shows an example convolutional neural network used in the trained reinforcement learning model of the computing system of FIG. 1.

The first image 20 and the second image 30 may respectively include a first region of interest 22 and a second region of interest 32. The first region of interest 22 and the second region of interest 32 may each include a respective plurality of spatially contiguous pixels. In some embodiments, the first region of interest 22 and/or the second region of interest 32 may be the entire image. Alternatively, the first region of interest 22 and/or the second region of interest 32 may be a subset of the plurality of pixels included in the image. In such embodiments, the first region of interest 22 and/or the second region of interest 32 may be selected via manual or programmatic image segmentation. In one particular approach, illustrated in FIG. 2, the region of interest ROI may be selected by the arrangement of one or more convolutional layers within a convolutional neural network (CNN) of the trained reinforcement learning model 50. For example, a node in a first convolutional layer may be configured to receive input from a 3×3 grid of pixels, and a node in a second convolutional layer may be configured to receive input from nine nodes in the first convolutional layer, thereby performing convolutions on a 9×9 grid of pixels in the input image. In this manner, the topology of the nodes within the convolutional layers of the reinforcement learning model 50 may define the region of interest. Although one example 9×9 pixel grid comprising a region of interest is illustrated FIG. 2, it will be understood that the entire image would be comprised of multiple regions of interest, which are handled in parallel by the various nodes within the convolutional layers concurrently. The output of the convolutional layers is a two-dimensional feature vector. Further, in some embodiments, the neural network formed by the convolutional layers may be pretrained to recognize visual features, such as corners, edges, etc., in images.

Figure 3:
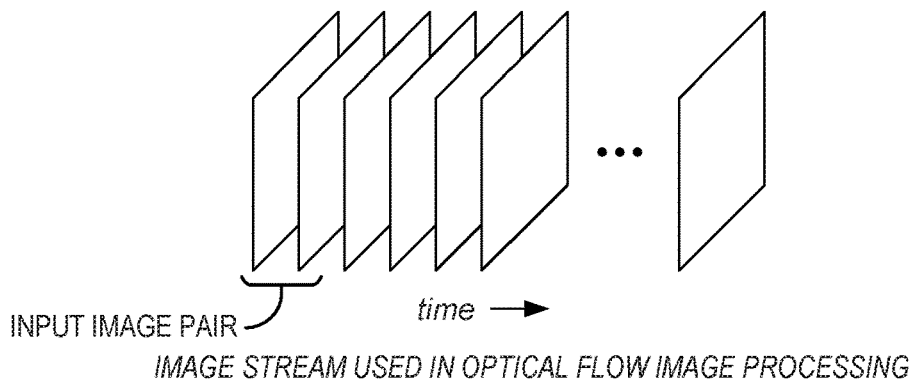
FIG. 3 schematically shows a first example of an image stream that may be processed by the computing system of FIG. 1, for optical flow processing.

Returning to FIG. 1, the processor 12 may be configured to receive a labeling map 40 for the first image 20. On the first image pair in a sequence of image pairs, the labeling map 40 may be set to an initial value state. The initial value state may be randomly selected, set to zero or some other predetermined value, etc. On each pass through the processing loop of FIG. 1, values of the labeling map 40 are updated. The labeling map 40 may indicate a spatial relationship between the first region of interest 22 included in the first image 20 and the second region of interest 32 included in the second image 30. In some embodiments, the labeling map 40 may be an optical flow map 44 of a plurality of optical flow values 45 between pixels that are respectively included in the first region of interest 22 of the first image 20 and the second region of interest 32 of the second image 30. An optical flow map 44 may be used in embodiments in which the first image 20 and the second image 30 are sequential frames of a video, taken at times $t_0$ and $t_1$ for example. In such embodiments, each optical flow value 45 may be a two-dimensional displacement vector between a pixel included in the first region of interest 22 captured at $t_0$ and a corresponding pixel included in the second region of interest 32 captured at $t_1$. The correspondence between the pixels may be determined by identifying visual features represented by the pixel and possibly surrounding pixels, using, for example convolutional neural network layers. By determining a point cloud of such features in the first image captured at $t_0$ using the convolutional neural network layers and tracking where the features that comprise the point cloud in the first image have moved in the second image captured at $t_1$, a pixelwise optical flow vector field may be determined between the two images. Conventional approaches to determining optical flow include, for example, using deterministic algorithms such as the Lucas-Kanade and Horn-Schunk methods. In contrast to such deterministic algorithms the embodiments disclosed herein use reinforcement learning to train model 50 to calculate a transform T that rectifies the second image to the first image, and then minimize the misalignment between the rectified second image and the first image. FIG. 3 illustrates an example image stream that is used in optical flow image processing. It will be appreciated that during processing the first and second images of the input image pair are selected by a rolling window that proceeds through the series of images. Thus, the first and second image may comprise the input image pair on a first pass through the processing loop of FIG. 1, and the second and third image may comprise the input image pair on a second pass through the processing loop, etc.

Returning to FIG. 1, alternatively, the labeling map 40 may be a disparity map 46 of a plurality of pixel disparity values 47 between pixels that are respectively included in the first region of interest 22 of the first image 20 and the second region of interest 32 of the second image 30. Although the first and second images in the optical flow example are typically captured at different points in time, the first and second images in this example are typically captured at the same (or nearly the same) time, although for still scenes this is not necessarily the case. A disparity map 46 may be used, for example, in stereoscopic vision configurations in which the first image 20 and the second image 30 are images of the same three-dimensional scene taken from different perspectives, typically at the same time. Each pixel in the disparity map is assigned a value representing the distance between that pixel in the first image, and a corresponding pixel in the second image that contains or is included in the same visual feature. This value may be visualized as pixel intensity, in a range from black (zero disparity/zero intensity) to white (maximum disparity/maximum intensity). It will be appreciated that objects in the foreground of an imaged scene tend to have higher disparity due to parallax effects of the different camera poses of each camera (e.g., right camera, left camera) in the stereoscopic imaging system, and thus would be visually represented in lighter intensities, while objects in the distance would tend to have a lower disparity and therefore be represented in darker intensities. Put another way, for each pixel in the first region of interest 22, the disparity map 46 may indicate via that pixel's intensity value a difference (i.e. disparity) in pixel location between that pixel and a corresponding pixel in the second region of interest 32. It will be appreciated that a disparity map may be used to determine depth of the pixels in the image, for example by using the relationship depth=baseline*focal/disparity.

Figure 4:
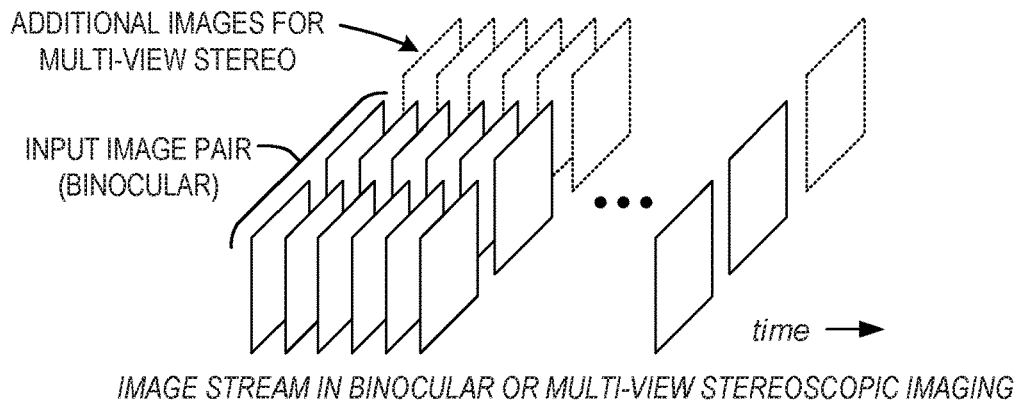
FIG. 4 schematically shows a second example of an image stream that may be processed by the computing system of FIG. 1, for binocular or multi-view stereoscopic imaging.

Continuing with FIG. 1, as yet another alternative, the labeling map 40 may be a depth map 48 of a plurality of spatial depth values 49 of pixels that are respectively included in the first region of interest 22 of the first image 20 and the second region of interest 32 of the second image 30. The spatial depth value 49 of a pixel may be a scalar depth-coordinate value computed for that pixel. In some embodiments, the depth map 48 may be computed based on both the first image 20 and the second image 30. A depth map 48 may be used, for example, in embodiments in which three or more images of the same three-dimensional scene are received at the processor 12 from three or more respective image sensors. In such embodiments, the processor 12 may be configured to receive a plurality of labeling maps 48 corresponding to pairs of images. FIG. 4 illustrates an example input stream for use in binocular or multi-view stereoscopic imaging as described above. A pair or a tuple of three (or more) images captured at a common moment in time comprise the input images in this example.

Returning to FIG. 1, subsequently to receiving the first image 20, the second image 30, and the labeling map 40, the processor 12 may be further configured to generate an updated labeling map 60 for the first image 20 based on at least the labeling map 40, the first image 20, and the second image 30. The updated labeling map 60 may be generated at a trained reinforcement learning model 50. The updated labeling map 60 may be a version of the labeling map 40 that has been updated by the trained reinforcement learning model 50 to more accurately reflect the spatial relationship which the labeling map 40 indicates for the first region of interest 22 and the second region of interest 32, for example, as the reinforcement learning model 50 cycles within an episode as described below. The trained reinforcement learning model 50 includes an agent module 110 and an environment module 130, as further described below. The agent module 110 may take several forms, and typically includes one or more neural networks, each having an input layer, one or more hidden layers, and an output layer. Each of the input layer, the output layer, and the one or more hidden layers may include one or more neurons are connected to neurons in other layers by respective neuronal weights. The weights themselves may be calculated by gradient descent back-propagation or other technique during training.

Figure 10B:
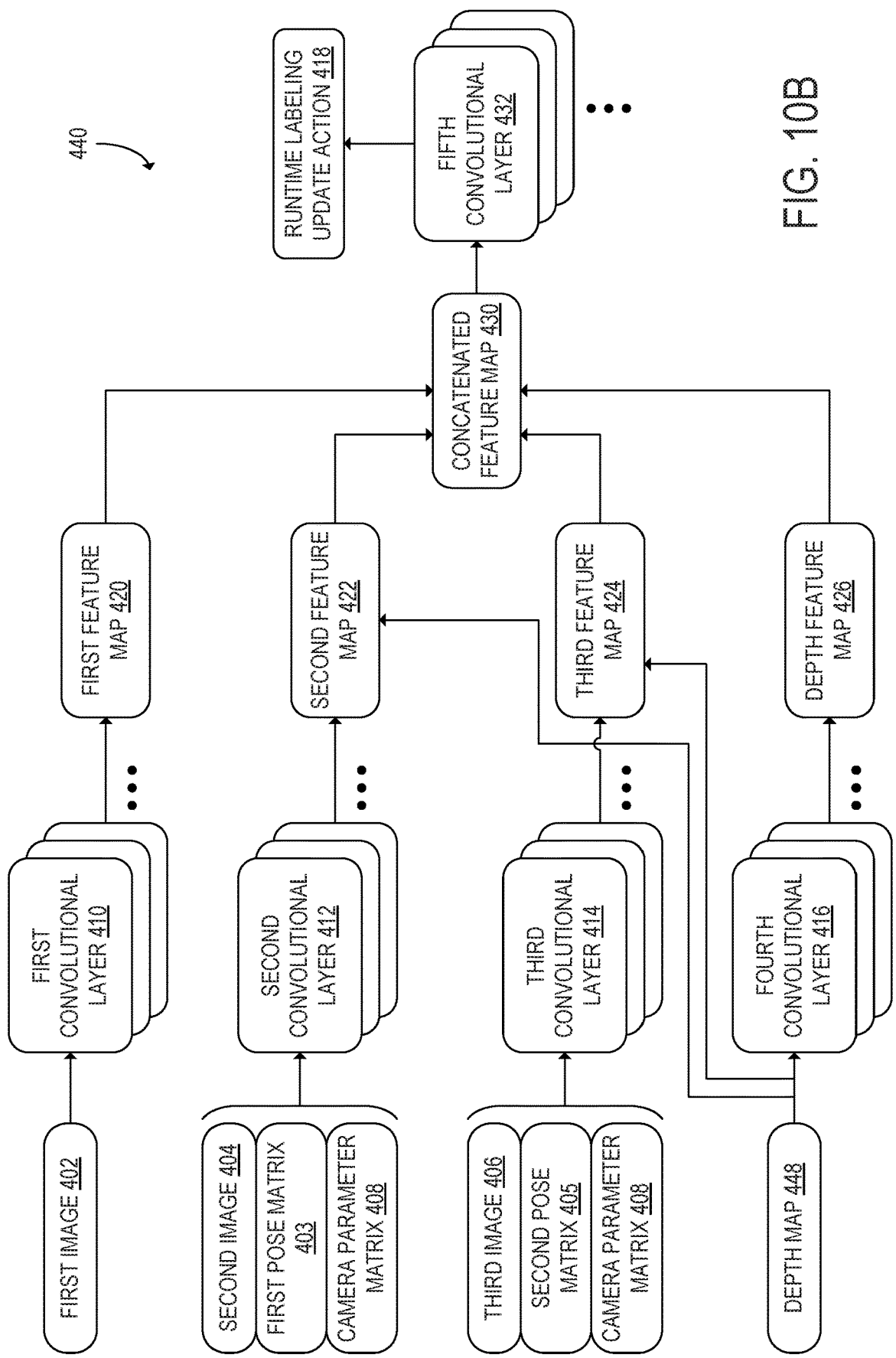
FIG. 10B shows an example data flow when the processor generates a runtime labeling update action for a depth map at least in part by using respective images received from the first camera, the second camera, and the third camera of FIG. 10A.

In FIG. 1, as one example, the agent module 110 is shown configured as a disparity map updating agent. The disparity map updating agent is shown in more detail in FIG. 8, and includes three input channels for the right image $I_R$ (reference image), left image $I_L$ and the current learning map $L_t$. Similarly trained feature extraction CNNs operate on each of the right and left images as input and produce respective feature vectors $F_L$ and $F_R$, which for example may be two dimensional arrays of visual features identified in each pixel location. The feature vector $F_R$ is rectified with $F_L$ (i.e., the pixelwise position of the features in each vector are made to correspond) by performing a transform on $F_R$ using the current labeling map $L_t$, to thereby produce a rectified feature vector $F'_R$. A separate CNN receives as input the learning map $L_t$ and produces a feature vector $F_{Lt}$. The three feature vectors are concatenated and fed as input to a fourth CNN, which outputs an action vector $a_t$, which is passed to a transition module 131 of environment module 130, which in turn performs the actions on the current labeling map $L_t$ to produce $L_{t+1}$, herein referred to as the updated labeling map 60. Additional details of the disparity map updating agent are described below in relation to FIG. 8. Alternatively, the agent module 110 may be configured as an optical flow map updating agent as shown in FIG. 9, a multi-stereo view depth map updating agent as shown in FIGS. 10A and 10B, or other type of spatial relationship map updating agent.

Example types of reinforcement learning models that may be used for the trained reinforcement learning model 50 include Deep Q-Networks (DQN), Asynchronous Actor-Critic (A2C), Asynchronous Advantage Actor-Critic (A3C), Proximal Policy Optimization (PPO). Other reinforcement learning model types, or combinations of the above types, may alternatively be used as the trained reinforcement learning model 50.

After the updated labeling map 60 has been generated, the processor 12 may be further configured to output the updated labeling map 60. This output may be to a memory location for use by another software program, or via the one or more output devices 18. The output typically occurs at a suitable timing in processing such as following the conclusion of a reinforcement learning episode. Typically, at each stage within a reinforcement learning episode, the updated labeling map 60 is set to the current labeling map 40 for the next loop of processing, as shown. Once the episode has concluded, the updated labeling map 60 may be output. As for example forms of output, the output of the updated labeling map 60 may be as a file or data structure that is transmitted, typically via storage at a memory location, to a downstream software program, which utilizes the updated labeling map 60 in processing, for example, to compute a value for depth, disparity, or optical flow for each pixel in the reference input image. The downstream software program may be a computer vision program configured to analyze real time images from cameras, or configured to analyze stored images. Additionally or alternatively, the processor 12 may be configured to generate a graphical representation of the updated labeling map 60 and output the graphical representation for display on a graphical user interface (GUI). Further, in embodiments in which the computing system 10 includes one or more server computing devices, the processor 12 may be further configured to convey the updated labeling map to one or more client computing devices and/or other server computing devices.

Figure 6:
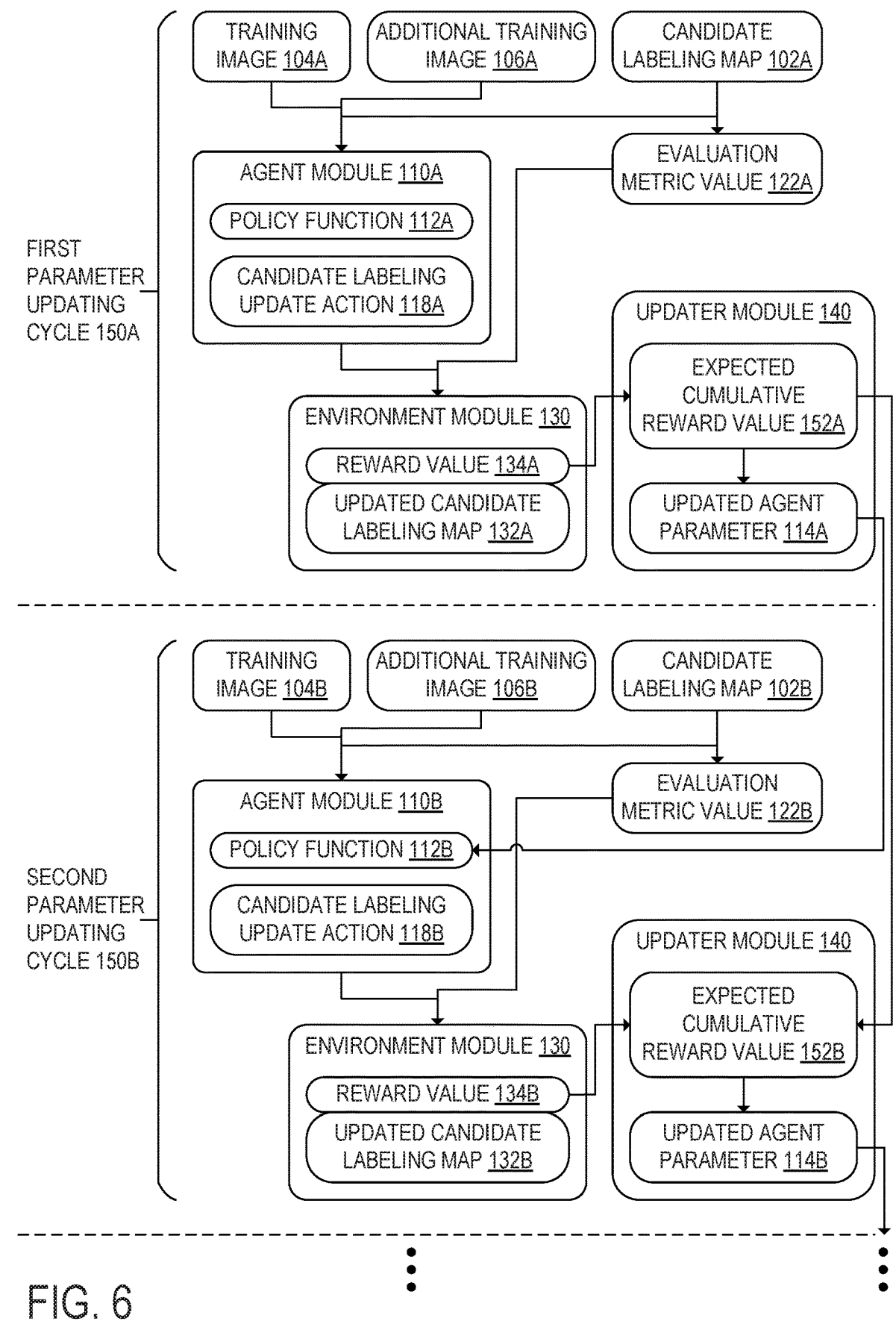
FIG. 6 shows a first parameter updating cycle and a second parameter updating cycle that may occur when generating the trained reinforcement learning model as shown in the example of FIG. 5.

The processor 12 may be configured to train the trained reinforcement learning model 50, as shown in FIG. 6. The trained reinforcement learning model 50 may be trained using a plurality of training images 104. Each training image 104 may have one or more respective training regions of interest 105, which may be manually or programmatically identified prior to training the trained reinforcement learning model 50. When training the trained reinforcement learning model 50, for each of the plurality of training images 104, the processor 12 may be configured to input that training image 104 into the agent module 110. The agent module 110 may be further configured to receive a candidate labeling map 102 that indicates a candidate spatial relationship between the one or more training regions of interest 105 of the first training image 104 and one or more corresponding additional training regions of interest 107 of an additional training image 106. For example, the candidate labeling map 102 may be an optical flow map, a disparity map, or a depth map.

At the agent module 110, the processor 12 may be further configured to determine a candidate labeling update action 118 for the candidate labeling map 102 associated with the training image 104. The candidate labeling update action 118 may be a modification to the candidate labeling map 102. The processor 12 may be configured to determine the candidate labeling update action 118 at least in part by applying a policy function 112 with one or more agent parameters 114 to the candidate labeling map 102, the training image 104, and the additional training image 108. The policy function 112 may encode the layer structure and neuronal weights of the neurons included in the machine learning model as it is in the process of being trained.

At an evaluation module 120, the processor 12 may be further configured to determine an evaluation metric value 122 for the candidate labeling map 102. The training image 104 and/or the additional training image 106 may additionally be used as inputs to the evaluation module 120 when determining the evaluation metric value 122. For example, when the candidate labeling map 102 is a disparity map, the evaluation metric value 122 may be given by the following equation:

$$E(L_t, I_L, I_R) = \sum_p |I_L(p) - I'_R(p)|$$

In this equation, E is the evaluation metric value 122, $L_t$ is the current candidate labeling map 102, $I_L$ and $I_R$ are images containing an array of pixel values for a left image and a right image respectively, and p are the pixels included in the candidate region of interest 105. $I_R'$ is a transformed or rectified right image that is generated by applying the candidate labeling map $L_t$ to the right image $I_R$ to align the location of features in the right image $I_R$ with the corresponding locations of those features in the left image $I_L$.

In embodiments in which the candidate labeling map is a depth map instead of a disparity map, the above equation may be used with depth values in place of pixel disparity values. When a depth map is generated, the need for downstream processing to separately convert the disparity map to a depth map is obviated. In embodiments in which the candidate labeling map is an optical flow map, the above equation may be used with optical flow vectors in place of pixel disparity values.

In some embodiments, at the evaluation module 120, the processor 12 may be further configured to receive a manually generated labeling map 124. The processor 12 may be further configured to determine the evaluation metric value 122 based at least in part on a difference between the candidate labeling map 102 and the manually generated labeling map 124. For example, the following equation for the evaluation metric value 122 may be used:

$$E(L_t, L^*) = \sum_p |L_t(p) - L^*(p)|$$

In this equation, L* is the manually generated labeling map 124. The values of $L_t$ and L* in the above equation may be disparity values when the labeling map is a disparity map or depth values when the labeling map is a depth map. When the labeling map is an optical flow map, the values of $L_t$ and L* may be optical flow vectors.

The above equations for the evaluation metric value 122 each indicate a respective amount of error in the candidate labeling map 102. In other embodiments, equations for the evaluation metric value 122 other than the two examples provided above may be used.

The processor 12 may be further configured to, at an environment module 130, determine an updated candidate labeling map 132 based on at least the candidate labeling map 102 and the candidate labeling update action 118. The processor 12 may make this determination by applying the candidate labeling update action 118 to the candidate labeling map 102. For example, in embodiments in which the candidate labeling map 102 and the candidate labeling update action 118 are both represented as matrices, the processor 12 may be configured to add the candidate labeling update action 118 to the candidate labeling map 102 or perform some other operation with the candidate labeling update action 118 or the candidate labeling map 102. Alternatively, the processor 12 may be configured to multiply the candidate labeling update action 118 by the candidate labeling map 102 to obtain the updated candidate labeling map 132.

In other embodiments, the processor 12 may alternatively be configured to determine the updated candidate labeling map 132 without reference to the candidate labeling map 102. For example, if the policy function 112 outputs a continuous disparity as a=p(x), where p(x)=CNN(x)+x is the sum of a current disparity map 46 and a residual map estimated at a CNN, the processor 12 may determine a at the environment module 130 without using the candidate labeling map.

At the environment module 130, the processor 12 may be further configured to determine a reward value 134 based on the candidate labeling update action 118 and the evaluation metric value 122. For example, the reward value 134 may equal a difference between the evaluation metric value 122 of the candidate labeling map 102 and an updated evaluation metric value computed for the updated candidate labeling map 132. The updated evaluation metric value may, for example, be computed using the same equation used to compute the evaluation metric value 122.

At an updater module 140, the processor 12 may be further configured to modify the one or more agent parameters 114 of the agent module 110 based at least in part on the candidate labeling map 102, the candidate labeling update action 118, the updated candidate labeling map 132, and the reward value 134. Thus, for each training image 104, the candidate labeling map 102, the candidate labeling update action 118, the updated candidate labeling map 132, and the reward value 134 may form a tuple of experiences with which the neuronal weights indicated by the policy function 112 are updated.

In some embodiments, the processor 12 may be further configured to determine an expected cumulative reward value 152. FIG. 6 shows a first parameter updating cycle 150A in which an agent module 110A is updated based on a candidate labeling map 102A, a training image 104A, and an additional training image 106A. In the example of FIG. 6, the agent module 110A has a policy function 112A. At the agent module 110A, the processor 12 is configured to generate a candidate labeling update action 118A by inputting the training image 104A, the additional training image 106A, and the candidate labeling map 102A into the policy function 112A. In addition, at the evaluation module 120, the processor 12 is further configured to determine an evaluation metric value 122A based on at least the candidate labeling map 102A. Based on the candidate labeling update action 118A and the evaluation metric value 122A, the processor 12 may be further configured to determine a reward value 134A. In addition, at the environment module 130, the processor 12 may be further configured to determine an updated candidate labeling map 132A.

Figure 5:
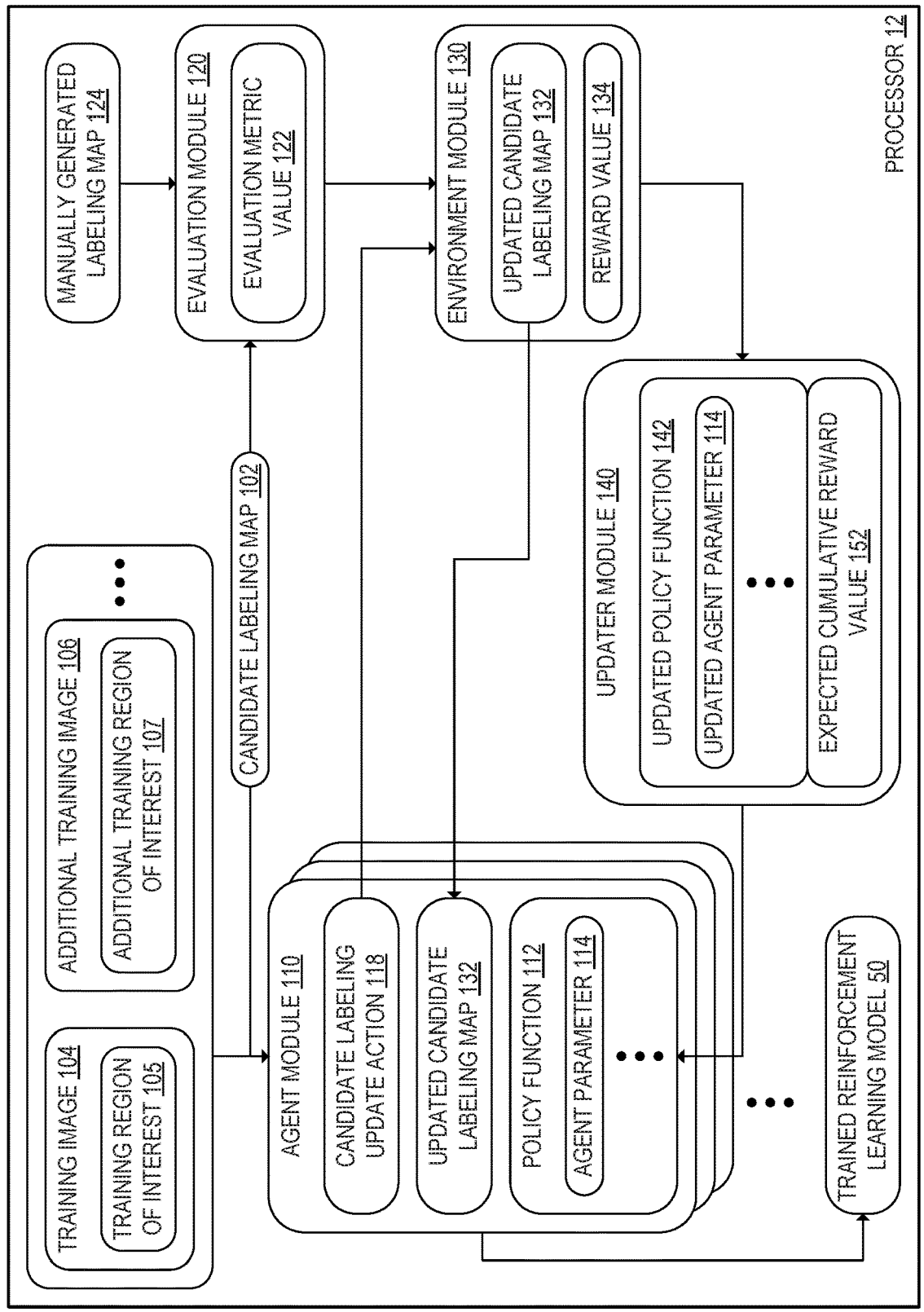
FIG. 5 schematically shows the processor, at training time, configured to train and generate a trained reinforcement learning model, according to the embodiment of FIG. 1.

At the updater module 140, the processor 12 may be further configured to track an expected cumulative reward value 152A by summing each reward value 134. At the updater module, the processor 12 may be further configured to determine one or more updated agent parameters 114A with which to update the policy function 112A based at least in part on the expected cumulative reward value 152A. As discussed above with reference to FIG. 5, the one or more updated agent parameters 114A may be further based on the candidate labeling map 102A, the candidate labeling update action 118A, and the updated candidate labeling map 132A.

FIG. 6 further shows a second parameter updating cycle 150B. The second parameter updating cycle 150B is performed using a training image 104B, additional training image 106B, and candidate labeling map 102B different from those used in the first parameter updating cycle 150A. The agent module 110B used in the second parameter updating cycle 150B has the updated agent parameters 114A generated during the first parameter updating cycle 150A, which are included in a policy function 112B. The agent module 110B is configured to generate a candidate labeling update action 118B based on the training image 104B, the additional training image 106B, and the candidate labeling map 102B. In addition, at the evaluation module 120, the processor 12 may be further configured to generate an evaluation metric value 122B based on at least the candidate labeling map 102B. Based on the candidate labeling update action 118B and the evaluation metric value 122B, the processor 12 may be further configured to determine a reward value 134B. In addition, at the environment module 130, the processor 12 may be further configured to determine an updated candidate labeling map 132B.

At the updater module 140, the processor 12 may be further configured to determine an expected cumulative reward value 152B by adding the reward value 134B to the expected cumulative reward value 152A from the first parameter updating cycle 150A. At the updater module 140, the processor 12 may be further configured to generate one or more updated agent parameters 114B, which may be further used to update the policy function 112B. Thus, over a plurality of parameter updating cycles 150A, 150B corresponding to the plurality of training images 104, the processor 12 may determine an expected cumulative reward value 152 based on the respective reward values 134 determined at the environment module 130 in those parameter updating cycles 150A, 150B. In some embodiments, the processor 12 may be further configured to select respective parameter values of the one or more agent parameters 114 that increase the expected cumulative reward value 152 in a current parameter updating cycle 150A, 150B. The processor 12 may thereby select agent parameters 114 for the agent module 110 that allow the agent module 110 to generate increasingly accurate updated candidate labeling maps 132. When training is complete (e.g. when a parameter updating cycle has been performed for each training image 104 of the plurality of training images 104), the agent module 110 may be used as the trained reinforcement learning model 50.

Returning to FIG. 5, the trained reinforcement learning model 50 may be a multi-agent reinforcement learning model including a plurality of agent models 110. In embodiments in which the trained reinforcement learning model 50 is a multi-agent reinforcement learning model, the processor 12 may be configured to train each agent module 110 using the plurality of training images 104. Each agent module 110 may have a different policy function 112. In some embodiments, the plurality of agent models 110 may be trained at separate computing devices via distributed learning. At runtime, the processor 12 may be configured to apply the agent models 110 sequentially to update the labeling map 40, as discussed in further detail below.

Figure 7:
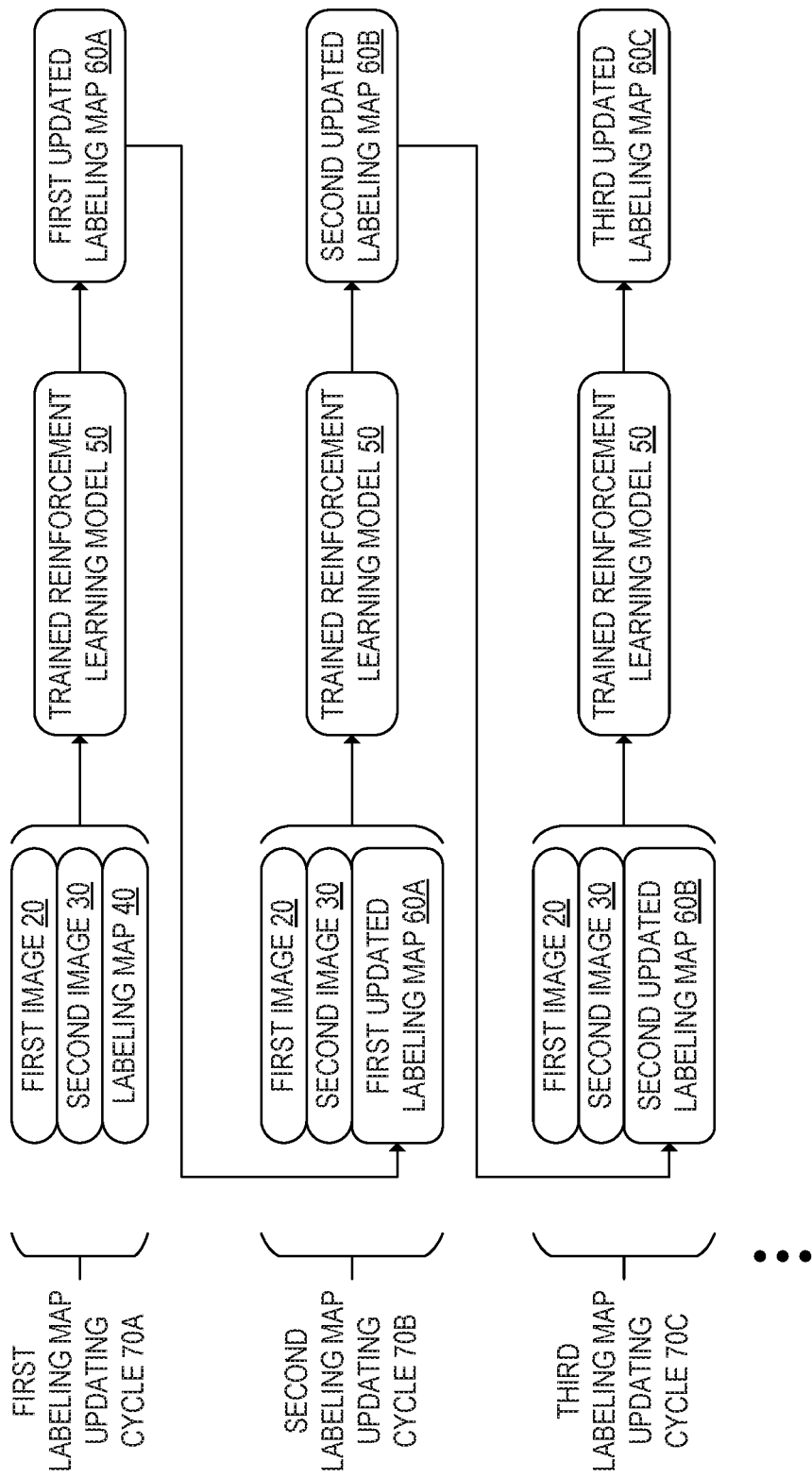
FIG. 7 shows a plurality of labeling map updating cycles, according to the embodiment of FIG. 1.

In some embodiments, as shown in FIG. 7, the processor 12 may be further configured to iteratively update the updated labeling map 60 at the trained reinforcement learning model 50 over a plurality of labeling map updating cycles. In the first labeling map updating cycle 70A shown in FIG. 7, the first image 20, the second image 30, and the labeling map 40 are input into the trained reinforcement learning model 50. From these inputs, the trained reinforcement learning model generates a first updated labeling map 60A. In a second labeling map updating cycle 70B, the first image 20, the second image 30, and the first updated labeling map 60A are used as inputs for the trained reinforcement learning model 50, which generates a second updated labeling map 60B. In a third labeling map updating cycle 70C, the first image 20, the second image 30, and the second updated labeling map 60B are used as inputs for the trained reinforcement learning model 50, which generates a third updated labeling map 60C. One or more additional labeling map updating cycles may also be performed. By repeatedly updating the labeling map 40, the processor 12 may increase the accuracy of the final updated labeling map 60 for a given reinforcement learning episode. In some embodiments, the processor 12 may be configured to use a plurality of different agent models 110 with different policy functions 112 to update the labeling map 40 in corresponding labeling map updating cycles. This cycle is repeated for each pair or tuple of input images in the series of images being processed.

FIG. 8 shows an example data flow 200 when the processor 12 generates a runtime labeling update action 218 with which the labeling map 40 may be updated. In the example of FIG. 8, the labeling map 40 is a disparity map 246. The disparity map 246 indicates a plurality of pixel coordinate differences between a left reference image 202 taken by a left camera and a right reference image 204 taken by a right camera in a binocular vision configuration. In the example of FIG. 8, the processor 12 is configured to generate a first feature map 220 of the first region of interest 22 and a second feature map 222 of the second region of interest 32 at one or more convolutional layers. The first region of interest 22 is the entire left reference image 202 and the second region of interest 32 is the entire right reference image 204 in the example of FIG. 8. The first feature map 220 is generated at a plurality of first convolutional layers 210 of a first CNN, and the second feature map 222 is generated at a plurality of second convolutional layers 212 of a second CNN. The first feature map 220 may indicate one or more features including a plurality of pixels and may further indicate the respective locations of those features in the left reference image 202. The one or more features may, for example, be edges, corners, or texture elements, and are typically though not necessarily scale-invariant.

The second feature map 222 may be generated at least in part at one or more second convolutional layers 212. Generating the second feature map 222 may further include transforming the output of the one or more second convolutional layers 212 using the disparity map 246. This transformation may be a linear transformation that maps the one or more respective locations of one or more features in the right reference image 204 as detected at the one or more second convolutional layers 212 to the one or more respective locations of one or more features in the left reference image 202 as detected at the one or more first convolutional layers 210.

The processor 12 may be further configured to generate a disparity feature map 224 for the disparity map 246 at one or more third convolutional layers 214 of a third CNN. For example, the disparity feature map 224 may indicate one or more occluded regions of the left reference image 202 or the right reference image 204. The disparity feature map 224 may additionally or alternatively indicate boundary adherence information, a level of smoothness or noisiness, or other feature information extracted from the disparity map 246. Based on the first feature map 220, the second feature map 222, and the disparity feature map 224, the processor 12 may be further configured to generate a concatenated feature map 230. The concatenated feature map 230 may indicate each of the features included in the first feature map 220, the second feature map 222, and the disparity feature map 224.

At a plurality of fourth convolutional layers 232 of a fourth CNN, the processor 12 may be further configured to generate a runtime labeling update action 218 from the concatenated feature map 230. The runtime labeling update action 218 may, in some embodiments, be a function with the same output variable space as the labeling map 40. In other embodiments, the runtime labeling update action 218 may be configured to output a categorical variable value. For example, for each pixel included in the first region of interest 22, the runtime labeling update action 218 may output a value selected from the set {0, 1, 2}. In this example, 0 may be an instruction to hold the disparity value of a pixel constant, 1 may be an instruction to increase the disparity value of the pixel by one, and 2 may be an instruction to subtract one from the disparity value of the pixel. Other categorical variables may be used as outputs of the runtime labeling update action 218 in other embodiments. In some embodiments, a concatenation of a plurality of continuous or categorical variables, or some combination thereof, may be the output of the runtime labeling update action 218.

FIG. 9 shows another example data flow 300 by which the processor 12 may generate a runtime labeling update action 318 when the labeling map 40 is an optical flow map 344. In the example of FIG. 9, the first image 20 and the second image 30 are a first frame image 302 and a second frame image 304 that are sequential frames of a video. As in the example of FIG. 8, a first feature map 320 may be generated from the first frame image 302 at a first convolutional layer 310 of a first CNN. In addition, the second frame image 304 may be input into a second convolutional layer 312 of a second CNN, and the output of the second convolutional layer 312 may be transformed with the optical flow map 344 to generate a second feature map 322. An optical flow feature map 324 may also be generated from the optical flow map 344 at one or more third convolutional layers 314 of a third CNN. The processor 12 may be further configured to generate a concatenated feature map 330 from the first feature map 320, the second feature map 322, and the optical flow feature map 324 that includes the features indicated in each of these feature maps. The processor 12 may then input the concatenated feature map 330 into one or more fourth convolutional layers 332 of a fourth CNN to generate the runtime labeling update action 318.

FIG. 10A shows an example imaging configuration 400 in which a first camera 16A, a second camera 16B, and a third camera 16C concurrently image the same physical environment 450 from different perspectives. The first camera 16A is configured to output a first image 402 to the processor 12, the second camera 16B is configured to output a second image 404 to the processor 12, and the third camera 16C is configured to output a third image 406 to the processor 12. Each of the first camera 16A, the second camera 16B, and the third camera 16C may be an RGB camera, an infrared camera, a depth camera, or any other suitable type of camera.

The processor 12 may be further configured to determine a first pose matrix 403 that indicates the position and orientation of the second camera 16B relative to the first camera 16A and a second pose matrix 405 that indicates the position and orientation of the third camera 16C relative to the first camera 16A. In some embodiments, the respective positions and orientations of the cameras may be determined based on data received from one or more respective additional sensors located proximate the cameras. For example, the one or more additional sensors may include one or more of a gyroscope, an accelerometer, a global positioning sensor, a magnetic field sensor, or some other type of position or orientation sensor.

Additionally or alternatively, the processor 12 may be configured to generate the first pose matrix 403 and/or the second pose matrix 405 based on one or more features detected in the images. In such embodiments, the first pose matrix 403 and/or the second pose matrix 405 may be estimated based on the labeling map 40. In embodiments in which the processor 12 is configured to iteratively update the labeling map 40 over a plurality of labeling map updating cycles, the processor 12 may be further configured to update its estimates of the first pose matrix 403 and/or the second pose matrix 405.

As discussed in further detail below, the processor 12 may be configured to use the first image 402, the second image 404, the third image 406, the first pose matrix 403, and the second pose matrix 405 as inputs when generating the updated labeling map 60. In addition, the processor 12 may further use a camera parameter matrix 408 as an input. The camera parameter matrix 408 may indicate one or more intrinsic properties of the cameras, which may include a focal length, a skew coefficient, and a principal point. In the example of FIG. 10A, the first camera 16A, the second camera 16B, and the third camera 16C have substantially the same intrinsic properties, which are represented by the same camera parameter matrix 408. In other embodiments, each camera may have corresponding camera parameter matrix 408.

FIG. 10B shows an example data flow 440 when the processor 12 generates a runtime labeling update action 418 for a depth map 448 that indicates a plurality of depth values for one or more objects located in the physical environment 450 depicted in the first image 402, second image 404, and third image 406 of FIG. 10A. At one or more first convolutional layers 410 of a first CNN, the processor 12 may be configured to generate a first feature map 420 for the first image 402. The processor 12 may be further configured to use the second image 404, the first pose matrix 403, and the camera parameter matrix 408 as inputs for one or more second convolutional layers 412 of a second CNN. The processor 12 may be further configured to transform the output of the one or more second convolutional layers 412 with the depth map 448 to generate a second feature map 422. Similarly, the processor 12 may be further configured to use the third image 406, the second pose matrix 405, and the camera parameter matrix 408 as inputs for one or more third convolutional layers 414 of a third CNN. The processor 12 may be further configured to transform the output of the one or more third convolutional layers 414 with the depth map 448 to generate a third feature map 424. The processor 12 may be further configured to generate a depth feature map 426 at one or more fourth convolutional layers 416 of a fourth CNN. From the first feature map 420, the second feature map 422, the third feature map 424, and the depth feature map 426, the processor 12 may be further configured to generate a concatenated feature map 430 including each feature indicated in the feature maps from which it is generated. The concatenated feature map 430 may then be input into one or more fifth convolutional layers 432 of a fifth CNN, at which the processor 12 may be configured to generate the runtime labeling update action 418.

Figure 11A:
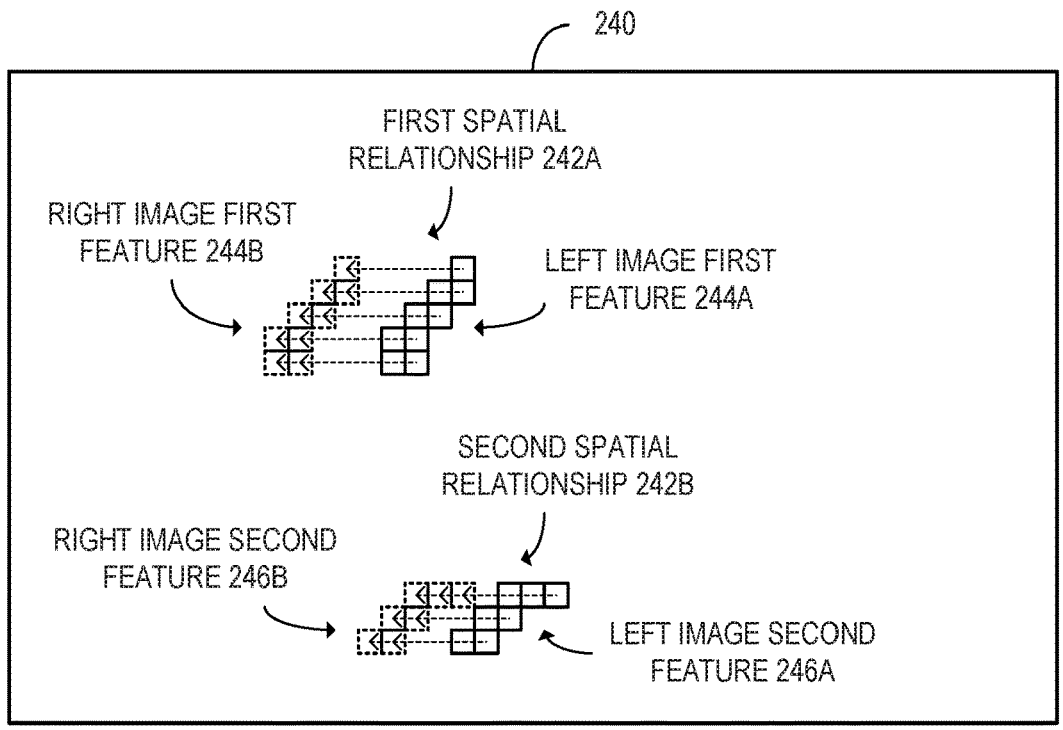
FIG. 11A shows an example disparity map, according to the embodiment of FIG. 1.

FIG. 11A shows an example disparity map 240 for a first image 20 and a second image 30 that are a left image and a right image respectively. For example, the first image 20 and the second image 30 may be the left reference image 202 and the right reference image 204 of FIG. 8. In the example disparity map 240 of FIG. 11A, the first image 20 includes a left image first feature 244A and a left image second feature 246A. Similarly, the second image 30 includes a right image first feature 244B and a right image second feature 246B. Each feature in the example of FIG. 11A includes a plurality of pixels. The disparity map 240 indicates a first spatial relationship 242A between the left image first feature 244A and the right image first feature 244B, shown in FIG. 11A as a plurality of vectors pointing from pixels included in the left image first feature 244A to corresponding pixels included in the right image first feature 244B. In addition, the disparity map 240 indicates a second spatial relationship 242B between the left image second feature 246A and the right image second feature 246B. In the example of FIG. 11A, the first spatial relationship 242A and the second spatial relationship 242B are leftward shifts of their respective features. The first spatial relationship 242A and the second spatial relationship 242B are each Euclidean distance values (i.e., the scalar value of the depicted vectors) representing the Euclidean distance between the corresponding pixels in each of the right and left images in the image pair. These Euclidean distance values may be visually represented via corresponding pixelwise intensity values, with darker intensity values indicating smaller disparity and lighter values indicating greater disparity, for example.

Figure 11B:
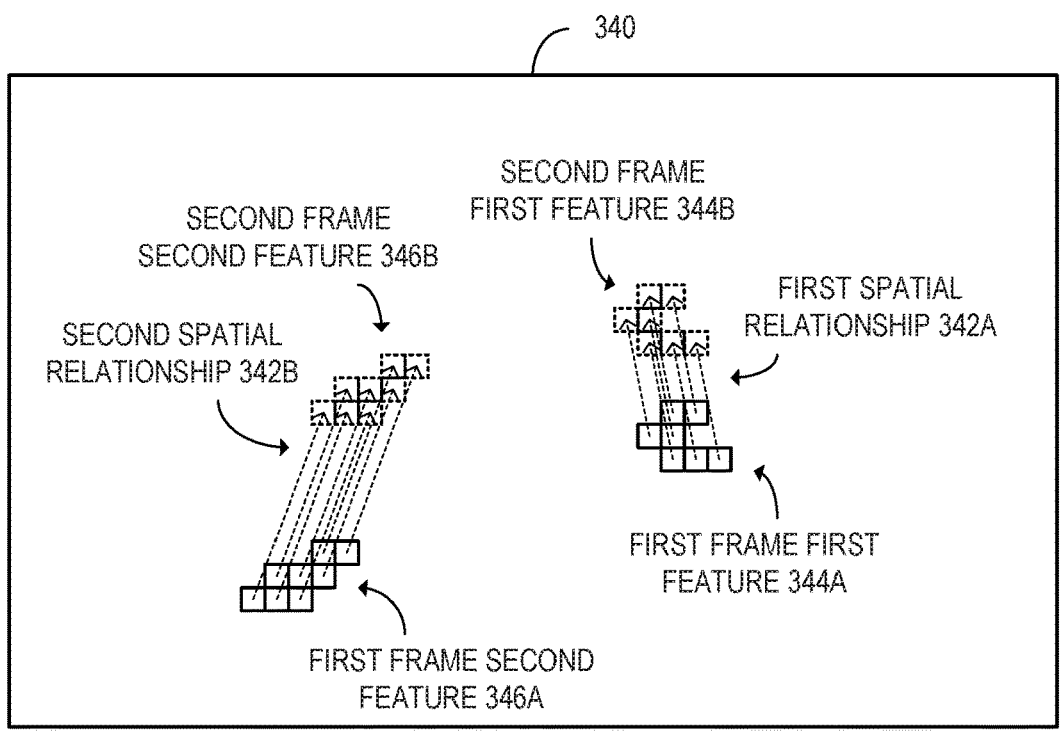
FIG. 11B shows an example optical flow map, according to the embodiment of FIG. 1.

FIG. 11B shows an example optical flow map 340 for a first image 20 and a second image 30 that are a first frame of a video and a second frame of a video respectively. For example, the first image 20 and the second image 30 may be the first frame image 302 and the second frame image 304 shown in FIG. 9. In the example optical flow map 340 of FIG. 11B, the first image 20 includes a first frame first feature 344A and a second frame first feature 346A. The second image 30 includes a second frame first feature 344B and a second frame second feature 346B. The example optical flow map 340 indicates a first spatial relationship 342A between the first frame first feature 344A and the second frame first feature 344B and a second spatial relationship 342B between the first frame second feature 346A and the second frame second feature 346B. The first spatial relationship 342A and the second spatial relationship 342B may each include a plurality of optical flow vectors between pixels in the first image 20 and corresponding pixels in the second image 30.

FIG. 11C shows a first depth map 440A for a first image 402 and a second image 404 and a second depth map 440B for the first image 402 and a third image 406. The first depth map 440A may indicate a respective depth value for each pixel included in the second image 404, which may be computed based on the respective displacements of those pixels in the second image 404 relative to the first image 402. Similarly, the second depth map 440B may indicate the respective depth values of pixels included in the third image 406, which may be computed based on the respective displacements of those pixels in the third image 406 relative to the first image 402. The first image 402 includes a first image first feature 444A and a first image second feature 446A, the second image 404 includes a second image first feature 444B and a second image second feature 446B, and the third image 406 includes a third image first feature 444C and a second image 446C. The first depth map 440A indicates a first spatial relationship 442A between the first image first feature 444A and the second image first feature 444B and a second spatial relationship 442B between the first image second feature 446A and the second image second feature 446B. In addition, the second depth map 440B indicates a third spatial relationship 442C between the first image first feature 444A and the third image first feature 444C and a fourth spatial relationship 442D between the first image second feature 446A and the third image second feature 446C. Each of these spatial relationships indicates a location difference between a respective pixel of the first image and a corresponding pixel of the second or third image.

Figure 12A:
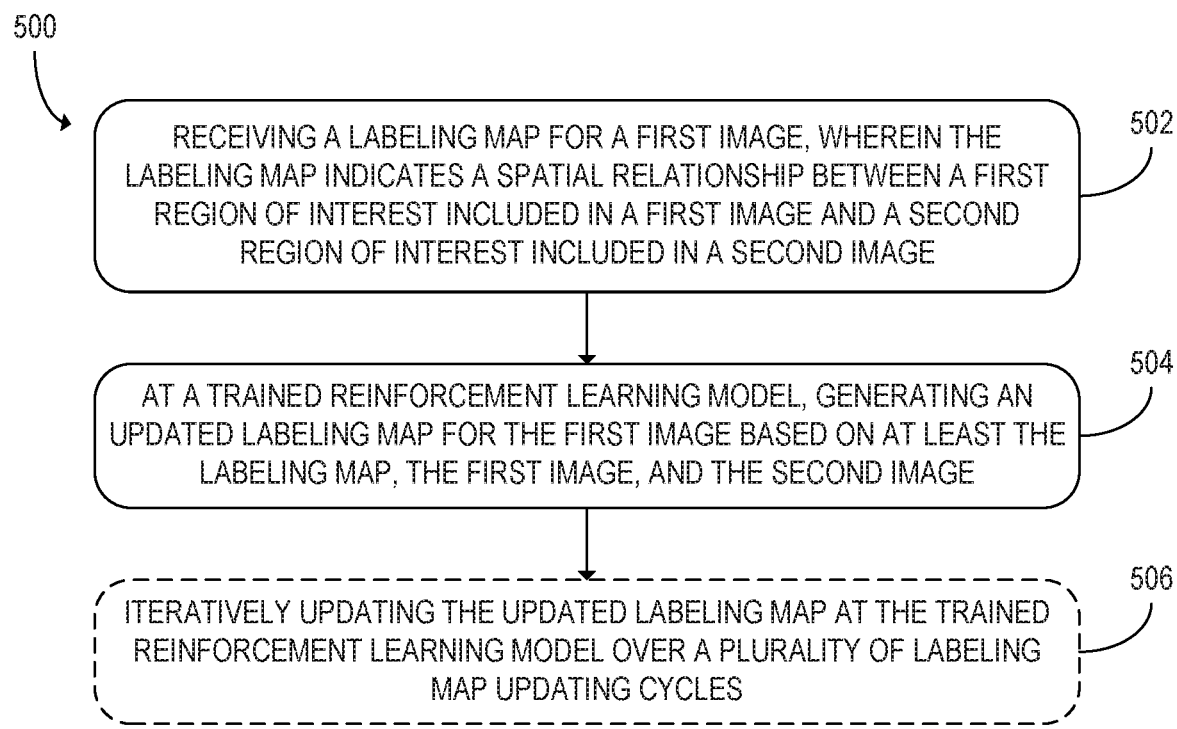
FIG. 12A shows a flowchart of an example method for use with a computing system to generate an updated labeling map, according to the embodiment of FIG. 1.

FIG. 12A shows a flowchart of method 500 for use with a computing system, according to one example embodiment. The computing system at which the method 500 is performed may be the computing system 10 of FIG. 1. At step 502, the method 500 may include receiving a labeling map for a first image. The labeling map may indicate a spatial relationship between a first region of interest included in the first image and a second region of interest included in a second image. The first region of interest and the second region of interest may each include a respective plurality of spatially contiguous pixels. The first region of interest and the second region of interest may each be all or part of the first image and the second image respectively. In some embodiments, the labeling map may be an optical flow map of a plurality of optical flow values between pixels that are respectively included in the first region of interest of the first image and the second region of interest of the second image. In other embodiments, the labeling map may be a disparity map of a plurality of pixel location disparities between pixels that are respectively included in the first region of interest of the first image and the second region of interest of the second image. In other embodiments, the labeling map may be a depth map of a plurality of spatial depth values of pixels that are respectively included in the first region of interest of the first image and the second region of interest of the second image.

At step 504, the method 500 may further include generating an updated labeling map for the first image based on at least the labeling map, the first image, and the second image. The updated labeling map may be generated at a trained reinforcement learning model. Example types of reinforcement learning model that may be used to generate the updated labeling map include Deep Q-Networks (DQN), Asynchronous Actor-Critic (A2C), Asynchronous Advantage Actor-Critic (A3C), and Proximal Policy Optimization (PPO). Other reinforcement learning techniques may additionally or alternatively be used.

In some embodiments, at step 506, the method 500 may further include iteratively updating the updated labeling map at the trained reinforcement learning model over a plurality of labeling map updating cycles. In each labeling map updating cycle subsequent to the first, the updated labeling map from the previous labeling map updating cycle may be used as an input at the trained reinforcement learning model along with the first image and the second image. Thus, the updated labeling map may become more accurate over the plurality of labeling map updating cycles within a reinforcement learning episode. In some embodiments, the trained reinforcement learning model may be a multi-agent reinforcement learning model that includes a plurality of agent modules. In such embodiments, one or more of the labeling map updating cycles may be performed at different agent modules of the plurality of agent modules.

Figure 12B:
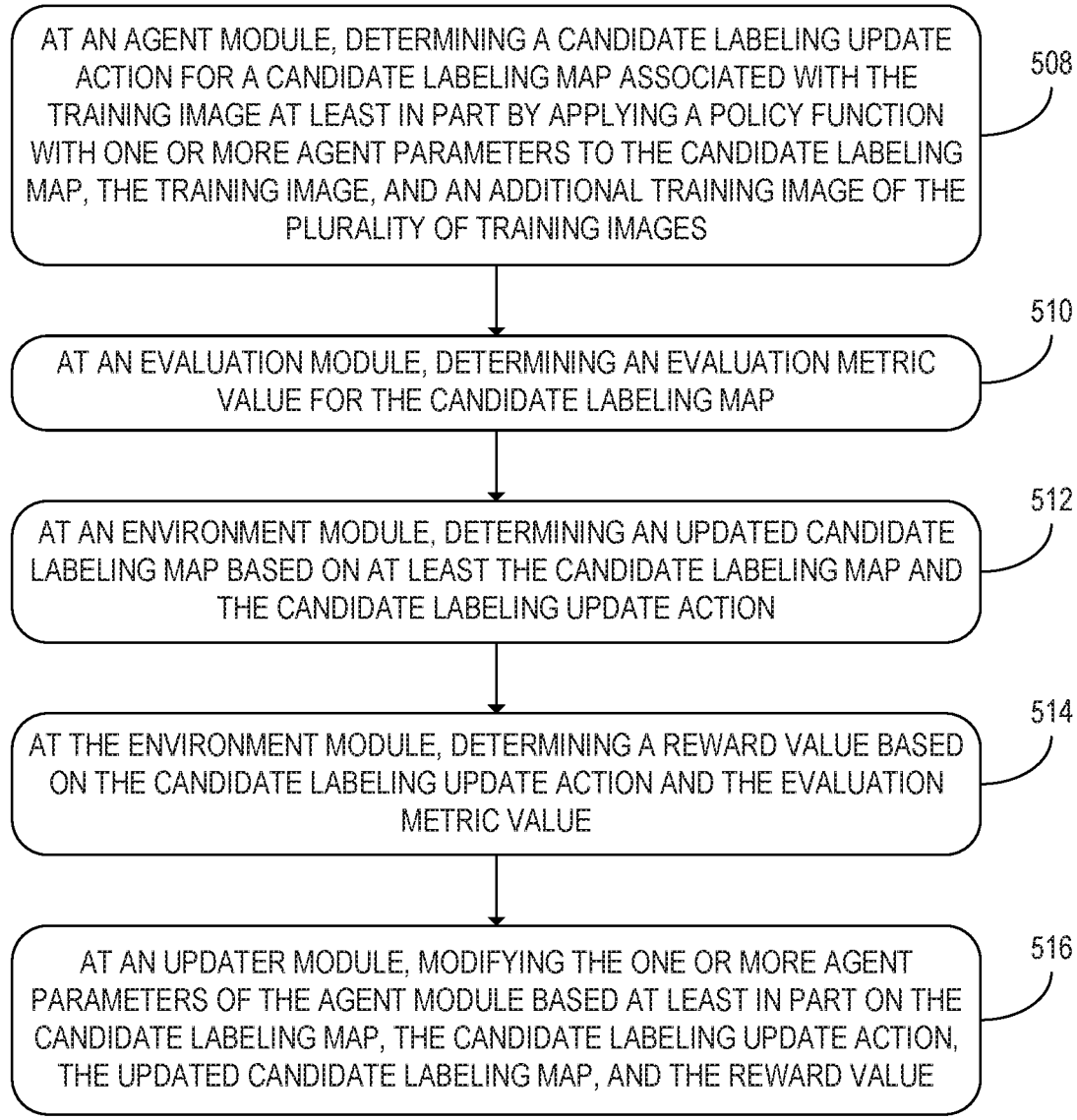
FIG. 12B shows additional steps of the method of FIG. 12A by which a trained reinforcement learning model may be generated.

FIG. 12B shows additional steps of the method 500 that may be performed prior to step 502 in order to train the trained machine learning algorithm with a plurality of training images. The steps shown in FIG. 12B may be performed for each training image included in the plurality of training images to iteratively update the parameters of an agent module over a plurality of parameter updating cycles, as discussed below with reference to FIG. 12D. At step 508, the method 500 may further include determining a candidate labeling update action for a candidate labeling map associated with the training image. Step 508 may be performed at an agent module. The candidate labeling update action may be determined at least in part by applying a policy function with one or more agent parameters to the candidate labeling map, the training image, and an additional training image of the plurality of training images.

At step 510, the method 500 may further include determining an evaluation metric value for the candidate labeling map. Step 510 may be performed at an evaluation module. For example, when ground truth labeling is available the evaluation metric may be a difference between the estimated and ground truth values for depth (when the candidate labeling map is a depth map) or disparity (when the candidate labeling map is a disparity map). On the other hand, when ground truth labeling is not available, the evaluation metric may be, for example, pixel intensity differences or value differences between two labeling maps, i.e., so called consistency loss. More specifically, when the labeling map is a disparity map, the evaluation metric value may be a sum of the absolute values of pixel disparity differences between the pixel disparity values indicated in the disparity map and the pixel disparity values of corresponding pixels in a ground truth disparity map. As another example, when ground truth labeling is available and when the labeling map is a depth map, the evaluation metric value may be a sum of the absolute values of pixel depth differences between the respective depth values indicated in the depth map and the depth values of corresponding pixels in a ground truth depth map. As another example, when the labeling map is an optical flow map, the evaluation metric may be a sum of the absolute values of optical flow difference vectors between optical flow values indicated in the optical flow map and the optical flow values indicated for corresponding pixels in a ground truth optical flow map. Other evaluation metrics, such as pixel intensity differences or consistency loss, may alternatively be used in other embodiments, as discussed above, for example when ground truth labeling is not available.

At step 512, the method 500 may further include, at an environment module, determining an updated candidate labeling map based on at least the candidate labeling map and the candidate labeling update action. Step 512 may include applying the candidate labeling update action to the candidate labeling map. For example, the candidate labeling update action may be a matrix that is added to the candidate labeling map. Alternatively, the candidate labeling update action may be a matrix that is multiplied by the candidate labeling map to obtain the updated candidate labeling map. In other embodiments, the updated candidate labeling map may be determined based on the candidate labeling update action without referring to the candidate labeling map.

At step 514, the method 500 may further include, at the environment module, determining a reward value based on the candidate labeling update action and the evaluation metric value. In some embodiments, determining the reward value may include determining an updated evaluation metric value for the updated candidate labeling map. In such embodiments, the reward value may, for example, be equal to a difference between the updated evaluation metric value and the evaluation metric value. Thus, in such embodiments, the reward may be a measure of a reduction in error that occurs when the candidate labeling map is updated. Other methods of computing the reward value may alternatively be used.

At step 516, the method 500 may further include modifying the one or more agent parameters of the agent module based at least in part on the candidate labeling map, the candidate labeling update action, the updated candidate labeling map, and the reward value. This modification may be performed at an updater module. Modifying the one or more agent parameters may include modifying one or more neuronal weights of one or more respective neurons included in the agent module.

Figure 12C:
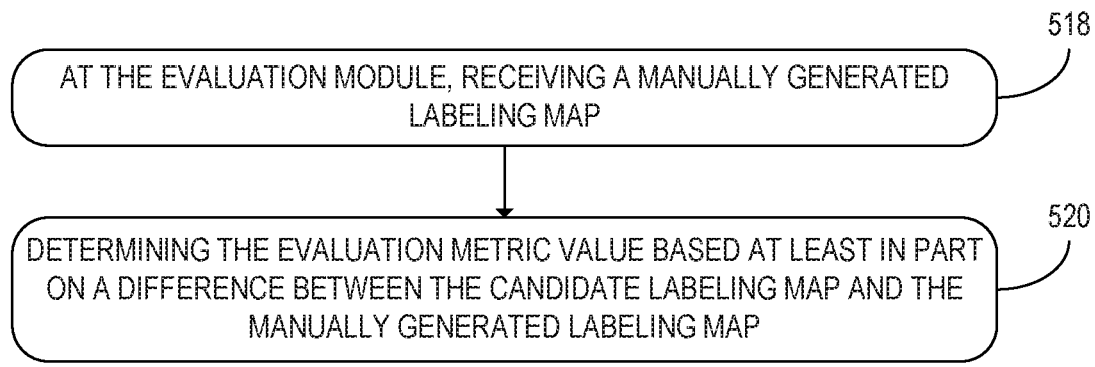
FIGS. 12C and 12D show additional steps that may be performed in some embodiments when performing the method of FIG. 12B.

FIG. 12C shows additional steps of the method 500 that may be performed in some embodiments when training the trained machine learning model as shown in FIG. 12B. At step 518, the method 500 may further include, at the evaluation module, receiving a manually generated labeling map. The manually generated labeling map may be used as a ground-truth labeling map to which updated candidate labeling maps are compared during training. At step 520, the method 500 may further include determining the evaluation metric value based at least in part on a difference between the candidate labeling map and the manually generated labeling map. Step 520 may be performed at the evaluation module as part of step 510.

Figure 12D:
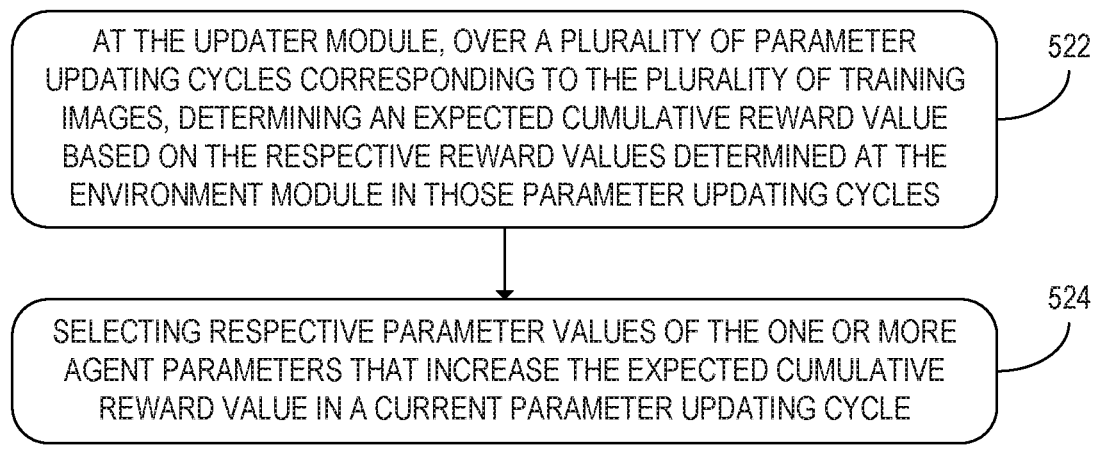

FIG. 12D shows additional steps of the method 500 that may be performed in embodiments in which the method 500 loops through a plurality of parameter updating cycles. At step 522, the method 500 may further include determining an expected cumulative reward value over a plurality of parameter updating cycles corresponding to the plurality of training images. The expected cumulative reward value may be determined based on the respective reward values determined at the environment module in those parameter updating cycles. Thus, the expected cumulative reward value may be tracked over the course of training the trained reinforcement learning model. At step 524, the method 500 may further include selecting respective parameter values of the one or more agent parameters that increase the expected cumulative reward value in a current parameter updating cycle. Step 524 may be performed when performing step 516 at the updater module.

During application of reinforcement learning techniques as described above to address the technical challenge of determining pixel correspondence in computer vision, attention mechanisms may be incorporated that are tuned to different time scales. In this manner, features that are only observed over short, medium, and long term time scales may be independently evaluated and rewarded when positive results are achieved via the reinforcement learning algorithms described above. Accordingly, it is envisioned that a more intelligent and computationally efficient search for pixel correspondences may be achieved.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
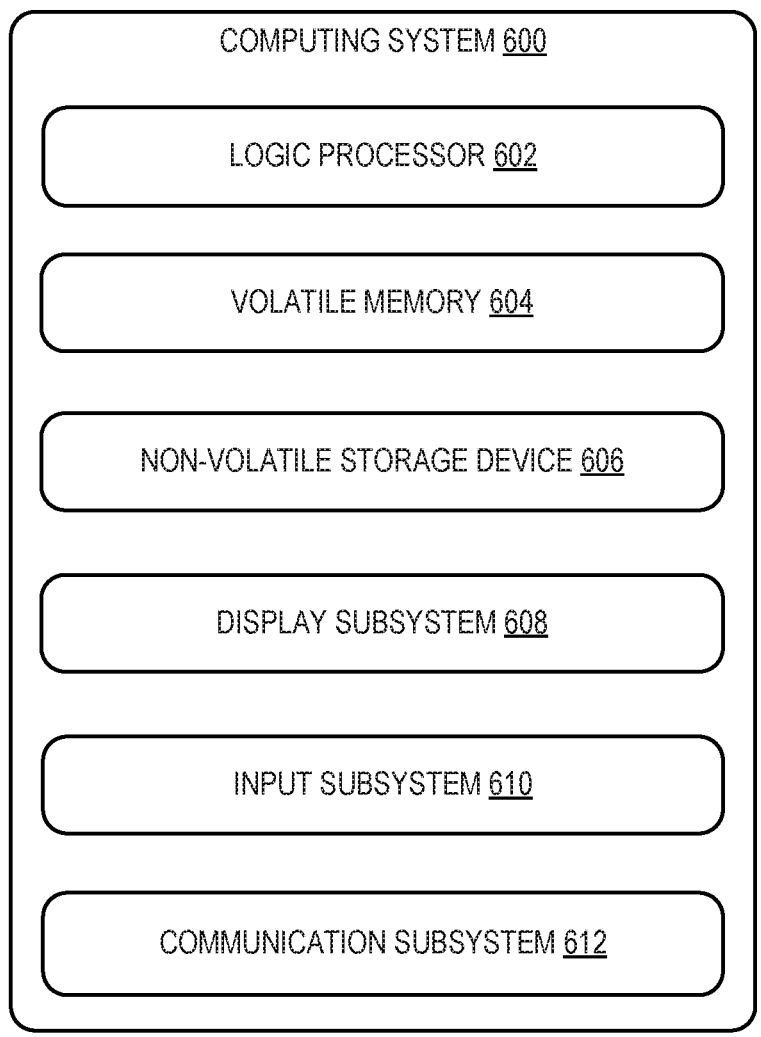
FIG. 13 shows a schematic view of an example computing environment in which the computing system of FIG. 1 may be enacted.

FIG. 13 schematically shows a non-limiting embodiment of a computing system 600 that can enact one or more of the methods and processes described above. Computing system 600 is shown in simplified form. Computing system 600 may embody the computing system 10 described above and illustrated in FIG. 1. Computing system 600 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 13.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs describe several aspects of the present disclosure. According to one aspect of the present disclosure, a computing system is provided, including a processor configured to receive a labeling map for a first image. The labeling map may indicate a spatial relationship between a first region of interest included in the first image and a second region of interest included in a second image. At a trained reinforcement learning model, the processor may be further configured to generate an updated labeling map for the first image based on at least the labeling map, the first image, and the second image.

According to this aspect, the trained reinforcement learning model may be trained using a plurality of training images. When training the trained reinforcement learning model, for each of the plurality of training images, the processor may be configured to, at an agent module, determine a candidate labeling update action for a candidate labeling map associated with the training image at least in part by applying a policy function with one or more agent parameters to the candidate labeling map, the training image, and an additional training image of the plurality of training images. The processor may be further configured to, at an evaluation module, determine an evaluation metric value for the candidate labeling map. The processor may be further configured to, at an environment module, determine an updated candidate labeling map based on at least the candidate labeling map and the candidate labeling update action. At the environment module, the processor may be further configured to determine a reward value based on the candidate labeling update action and the evaluation metric value. The processor may be further configured to, at an updater module, modify the one or more agent parameters of the agent module based at least in part on the candidate labeling map, the candidate labeling update action, the updated candidate labeling map, and the reward value.

According to this aspect, the candidate labeling map may indicate a candidate spatial relationship between a training region of interest of the training image and an additional training region of interest of the additional training image.

According to this aspect, at the evaluation module, the processor may be further configured to receive a manually generated labeling map and determine the evaluation metric value based at least in part on a difference between the candidate labeling map and the manually generated labeling map.

According to this aspect, at the updater module, the processor may be further configured to, over a plurality of parameter updating cycles corresponding to the plurality of training images, determine an expected cumulative reward value based on the respective reward values determined at the environment module in those parameter updating cycles. The processor may be further configured to select respective parameter values of the one or more agent parameters that increase the expected cumulative reward value in a current parameter updating cycle.

According to this aspect, the labeling map may be an optical flow map of a plurality of optical flow values between pixels that are respectively included in the first region of interest of the first image and the second region of interest of the second image.

According to this aspect, the labeling map may be a disparity map of a plurality of pixel location disparities between pixels that are respectively included in the first region of interest of the first image and the second region of interest of the second image.

According to this aspect, the labeling map may be a depth map of a plurality of spatial depth values of pixels that are respectively included in the first region of interest of the first image and the second region of interest of the second image.

According to this aspect, the processor may be further configured to generate a first feature map of the first region of interest and a second feature map of the second region of interest at one or more convolutional layers.

According to this aspect, the first region of interest and the second region of interest may each include a respective plurality of spatially contiguous pixels.

According to this aspect, the processor may be further configured to iteratively update the updated labeling map at the trained reinforcement learning model over a plurality of labeling map updating cycles.

According to this aspect, the trained reinforcement learning model may be a multi-agent reinforcement learning model.

According to another aspect of the present disclosure, a method for use with a computing system is provided. The method may include receiving a labeling map for a first image, wherein the labeling map indicates a spatial relationship between a first region of interest included in the first image and a second region of interest included in a second image. The method may further include, at a trained reinforcement learning model, generating an updated labeling map for the first image based on at least the labeling map, the first image, and the second image.

According to this aspect, the method may further include training the trained machine learning model with a plurality of training images at least in part by, at an agent module, determining a candidate labeling update action for a candidate labeling map associated with the training image at least in part by applying a policy function with one or more agent parameters to the candidate labeling map, the training image, and an additional training image of the plurality of training images. Training the trained machine learning model may further include, at an evaluation module, determining an evaluation metric value for the candidate labeling map. Training the trained machine learning model may further include, at an environment module, determining an updated candidate labeling map based on at least the candidate labeling map and the candidate labeling update action. Training the trained machine learning model may further include, at the environment module, determining a reward value based on the candidate labeling update action and the evaluation metric value. Training the trained machine learning model may further include, at an updater module, modifying the one or more agent parameters of the agent module based at least in part on the candidate labeling map, the candidate labeling update action, the updated candidate labeling map, and the reward value.

According to this aspect, the method may further include, at the evaluation module, receiving a manually generated labeling map and determining the evaluation metric value based at least in part on a difference between the candidate labeling map and the manually generated labeling map.

According to this aspect, the method may further include, at the updater module, over a plurality of parameter updating cycles corresponding to the plurality of training images, determining an expected cumulative reward value based on the respective reward values determined at the environment module in those parameter updating cycles. The method may further include selecting respective parameter values of the one or more agent parameters that increase the expected cumulative reward value in a current parameter updating cycle.

According to this aspect, the labeling map may be an optical flow map of a plurality of optical flow values between pixels that are respectively included in the first region of interest of the first image and the second region of interest of the second image.

According to this aspect, the labeling map may be a disparity map of a plurality of pixel location disparities between pixels that are respectively included in the first region of interest of the first image and the second region of interest of the second image.

According to this aspect, the labeling map may be a depth map of a plurality of spatial depth values of pixels that are respectively included in the first region of interest of the first image and the second region of interest of the second image.

According to another aspect of the present disclosure, a computing system is provided, including one or more processors configured to generate a trained reinforcement learning model using a plurality of training images. The processor may be configured to generate the trained reinforcement learning model at least in part by, for each of the training images, at an agent module, determining a candidate labeling update action for a candidate labeling map associated with the training image at least in part by applying a policy function with one or more agent parameters to the candidate labeling map, the training image, and an additional training image of the plurality of training images. The processor may be configured to generate the trained reinforcement learning model at least in part by, at an evaluation module, determining an evaluation metric value for the candidate labeling map. The processor may be configured to generate the trained reinforcement learning model at least in part by, at an environment module, determining an updated candidate labeling map based on at least the candidate labeling map and the candidate labeling update action. The processor may be configured to generate the trained reinforcement learning model at least in part by, at the environment module, determining a reward value based on the candidate labeling update action and the evaluation metric value. The processor may be configured to generate the trained reinforcement learning model at least in part by, at an updater module, modifying the one or more agent parameters of the agent module based at least in part on the candidate labeling map, the candidate labeling update action, the updated candidate labeling map, and the reward value. At runtime, the processor may be further configured to receive a labeling map for a first image. The labeling map may indicate a spatial relationship between a first region of interest included in the first image and a second region of interest included in a second image. The labeling map may be an optical flow map, a disparity map, or a depth map. At a trained reinforcement learning model, the processor may be further configured to generate an updated labeling map for the first image based on at least the labeling map, the first image, and the second image.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor configured to:
receive a labeling map for a first image, wherein the labeling map indicates a spatial relationship between a first region of interest included in the first image and a second region of interest included in a second image; and
at a trained reinforcement learning model, generate an updated labeling map for the first image based on at least the labeling map, the first image, and the second image, wherein
the trained reinforcement learning model is trained using a plurality of training images; and
when training the trained reinforcement learning model, for each of the plurality of training images, the processor is configured to:
at an agent module, determine a candidate labeling update action for a candidate labeling map associated with the training image at least in part by applying a policy function with one or more agent parameters to the candidate labeling map, the training image, and an additional training image of the plurality of training images;
at an evaluation module, determine an evaluation metric value for the candidate labeling map;
at an environment module, determine:
an updated candidate labeling map based on at least the candidate labeling map and the candidate labeling update action; and
a reward value based on the candidate labeling update action and the evaluation metric value; and
at an updater module, modify the one or more agent parameters of the agent module based at least in part on the candidate labeling map, the candidate labeling update action, the updated candidate labeling map, and the reward value.

2. The computing system of claim 1, wherein the candidate labeling map indicates a candidate spatial relationship between a training region of interest of the training image and an additional training region of interest of the additional training image.

3. The computing system of claim 1, wherein, at the evaluation module, the processor is further configured to:
receive a manually generated labeling map; and
determine the evaluation metric value based at least in part on a difference between the candidate labeling map and the manually generated labeling map.

4. The computing system of claim 1, wherein, at the updater module, the processor is further configured to:
over a plurality of parameter updating cycles corresponding to the plurality of training images, determine an expected cumulative reward value based on the respective reward values determined at the environment module in those parameter updating cycles; and
select respective parameter values of the one or more agent parameters that increase the expected cumulative reward value in a current parameter updating cycle.

5. The computing system of claim 1, wherein the labeling map is an optical flow map of a plurality of optical flow values between pixels that are respectively included in the first region of interest of the first image and the second region of interest of the second image.

6. The computing system of claim 1, wherein the labeling map is a disparity map of a plurality of pixel location disparities between pixels that are respectively included in the first region of interest of the first image and the second region of interest of the second image.

7. The computing system of claim 1, wherein the labeling map is a depth map of a plurality of spatial depth values of pixels that are respectively included in the first region of interest of the first image and the second region of interest of the second image.

8. The computing system of claim 1, wherein the processor is further configured to generate a first feature map of the first region of interest and a second feature map of the second region of interest at one or more convolutional layers.

9. The computing system of claim 1, wherein the first region of interest and the second region of interest each include a respective plurality of spatially contiguous pixels.

10. The computing system of claim 1, wherein the processor is further configured to iteratively update the updated labeling map at the trained reinforcement learning model over a plurality of labeling map updating cycles.

11. The computing system of claim 1, wherein the trained reinforcement learning model is a multi-agent reinforcement learning model.

12. A method for use with a computing system, the method comprising:
receiving a labeling map for a first image, wherein the labeling map indicates a spatial relationship between a first region of interest included in the first image and a second region of interest included in a second image; and
at a trained reinforcement learning model, generating an updated labeling map for the first image based on at least the labeling map, the first image, and the second image,
wherein the trained reinforcement learning model is trained using a plurality of training images at least in part by:
at an agent module, determining a candidate labeling update action for a candidate labeling map associated with the training image at least in part by applying a policy function with one or more agent parameters to the candidate labeling map, the training image, and an additional training image of the plurality of training images;
at an evaluation module, determining an evaluation metric value for the candidate labeling map;
at an environment module, determining:
an updated candidate labeling map based on at least the candidate labeling map and the candidate labeling update action; and
a reward value based on the candidate labeling update action and the evaluation metric value; and
at an updater module, modifying the one or more agent parameters of the agent module based at least in part on the candidate labeling map, the candidate labeling update action, the updated candidate labeling map, and the reward value.

13. The method of claim 12, further comprising, at the evaluation module:
receiving a manually generated labeling map; and
determining the evaluation metric value based at least in part on a difference between the candidate labeling map and the manually generated labeling map.

14. The method of claim 12, further comprising, at the updater module:
over a plurality of parameter updating cycles corresponding to the plurality of training images, determining an expected cumulative reward value based on the respective reward values determined at the environment module in those parameter updating cycles; and
selecting respective parameter values of the one or more agent parameters that increase the expected cumulative reward value in a current parameter updating cycle.

15. The method of claim 12, wherein the labeling map is an optical flow map of a plurality of optical flow values between pixels that are respectively included in the first region of interest of the first image and the second region of interest of the second image.

16. The method of claim 12, wherein the labeling map is a disparity map of a plurality of pixel location disparities between pixels that are respectively included in the first region of interest of the first image and the second region of interest of the second image.

17. The method of claim 12, wherein the labeling map is a depth map of a plurality of spatial depth values of pixels that are respectively included in the first region of interest of the first image and the second region of interest of the second image.

18. A computing system comprising:
one or more processors configured to:

generate a trained reinforcement learning model using a plurality of training images, at least in part by, for each of the training images:
  at an agent module, determining a candidate labeling update action for a candidate labeling map associated with the training image at least in part by applying a policy function with one or more agent parameters to the candidate labeling map, the training image, and an additional training image of the plurality of training images;
  at an evaluation module, determining an evaluation metric value for the candidate labeling map;
  at an environment module, determining:
    an updated candidate labeling map based on at least the candidate labeling map and the candidate labeling update action; and
    a reward value based on the candidate labeling update action and the evaluation metric value; and
  at an updater module, modifying the one or more agent parameters of the agent module based at least in part on the candidate labeling map, the candidate labeling update action, the updated candidate labeling map, and the reward value; and
at runtime:
  receive a labeling map for a first image, wherein:
    the labeling map indicates a spatial relationship between a first region of interest included in the first image and a second region of interest included in a second image; and
    the labeling map is an optical flow map, a disparity map, or a depth map; and
  at a trained reinforcement learning model, generate an updated labeling map for the first image based on at least the labeling map, the first image, and the second image.

\* \* \* \* \*